July 20, 1937.  H. A. TRIPLETT  2,087,744
METHOD OF AND MEANS FOR AUTOMATICALLY OPENING AND RECLOSING A CIRCUIT
Filed Oct. 21, 1933  6 Sheets-Sheet 1

Inventor:
Hugh A. Triplett
By
Attys.

July 20, 1937.  H. A. TRIPLETT  2,087,744
METHOD OF AND MEANS FOR AUTOMATICALLY OPENING AND RECLOSING A CIRCUIT
Filed Oct. 21, 1933    6 Sheets-Sheet 2

Inventor:
Hugh A. Triplett
By: Brown Jackson Boettcher & Dienner
Attys.

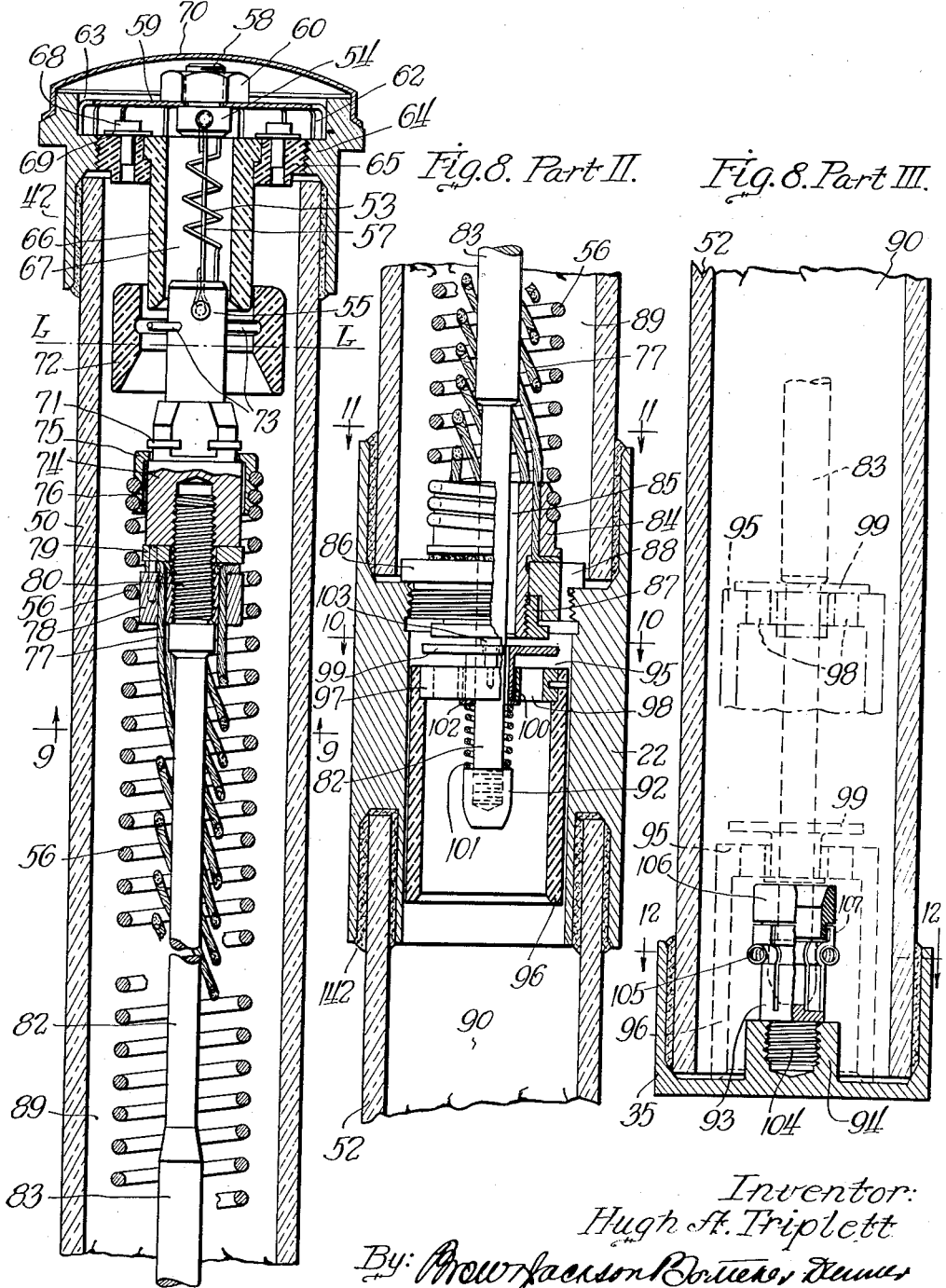

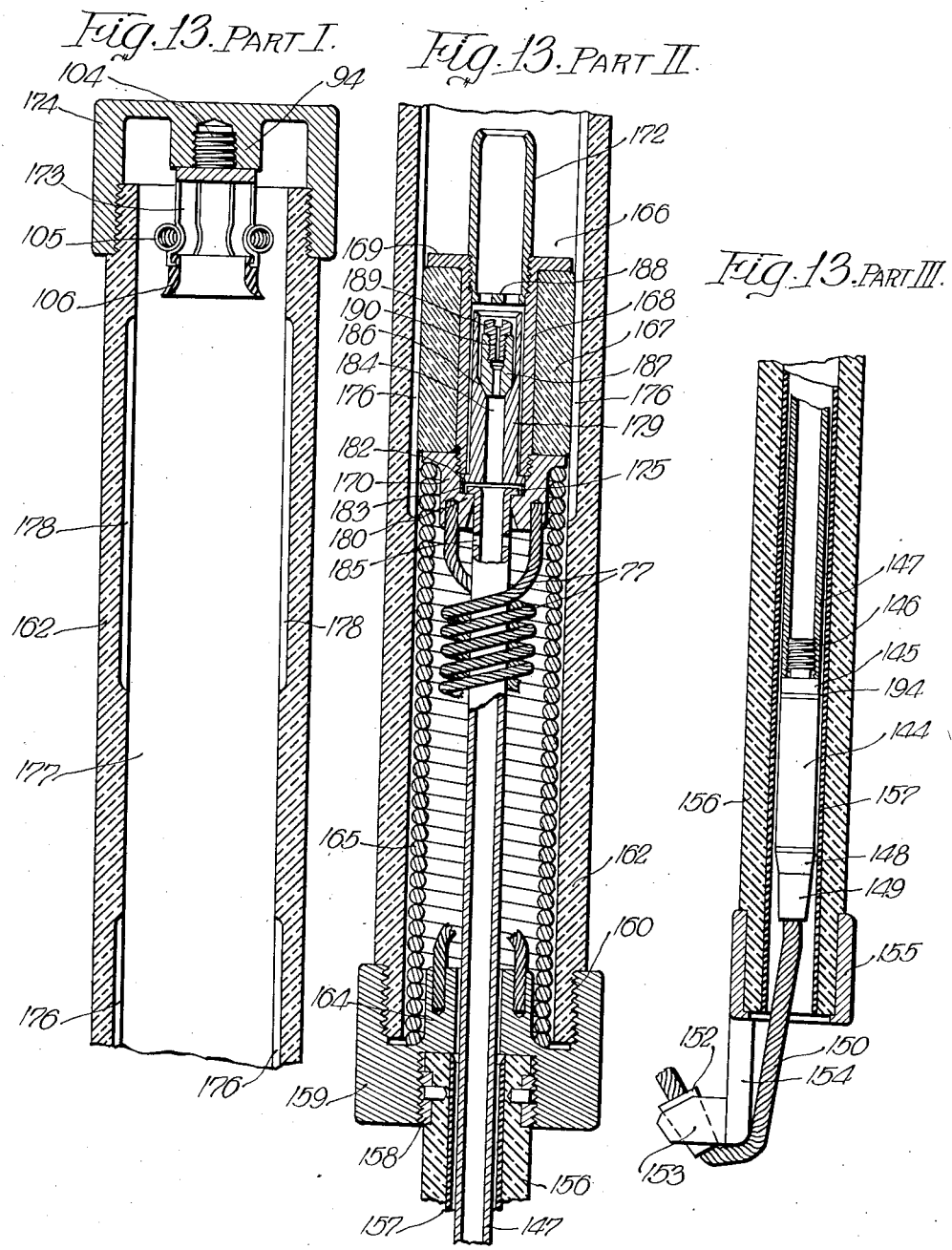

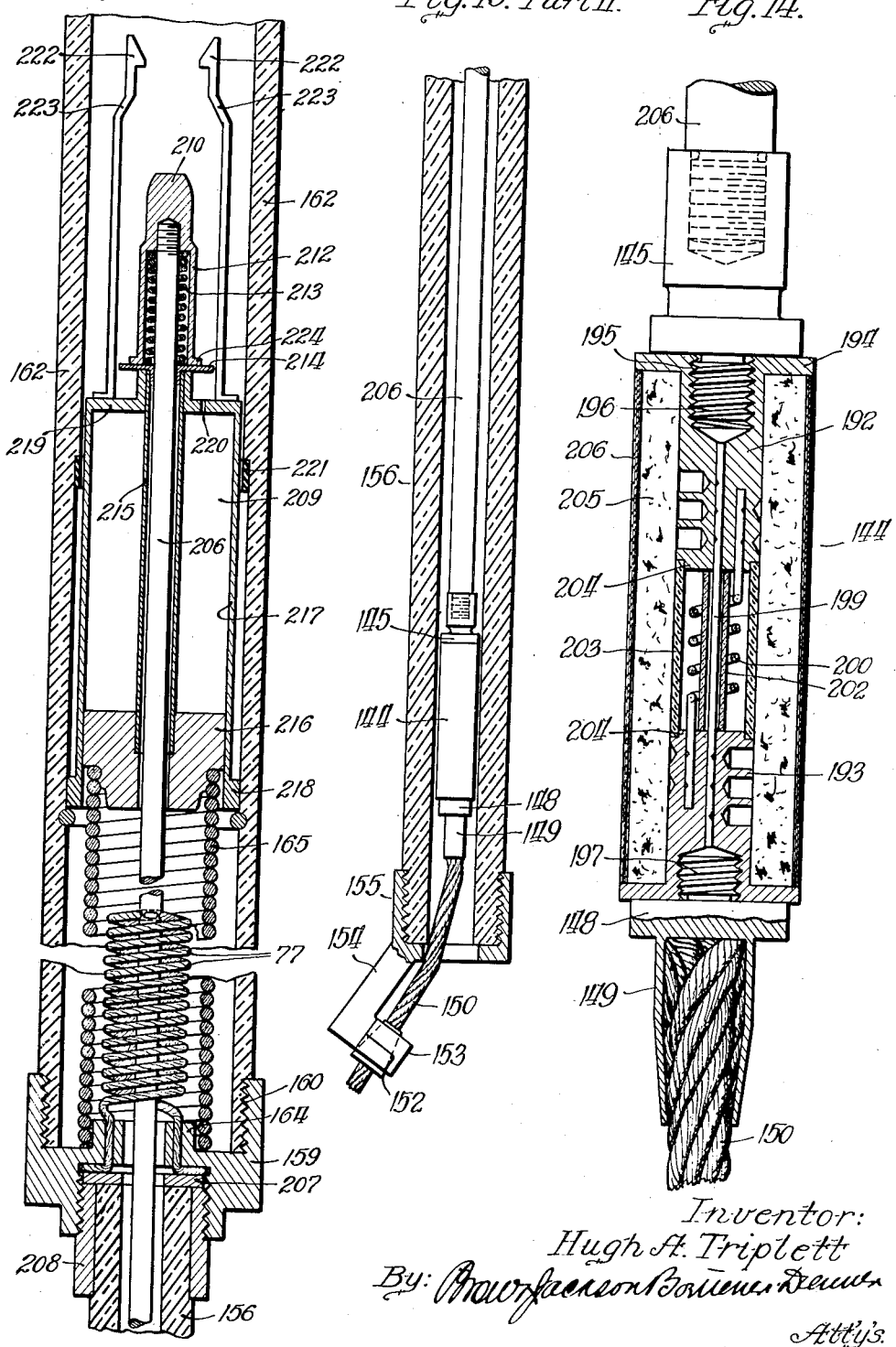

July 20, 1937. H. A. TRIPLETT 2,087,744
METHOD OF AND MEANS FOR AUTOMATICALLY OPENING AND RECLOSING A CIRCUIT
Filed Oct. 21, 1933 6 Sheets-Sheet 6

Inventor
Hugh A. Triplett
By: [signature]
Att'ys.

REISSUED

Patented July 20, 1937

JUL 15 1941

2,087,744

UNITED STATES PATENT OFFICE 2,087,744

METHOD OF AND MEANS FOR AUTOMATICALLY OPENING AND RECLOSING A CIRCUIT

Hugh A. Triplett, Wilmette, Ill., assignor to Schweitzer & Conrad, Inc., Chicago, Ill., a corporation of Delaware Application October 21, 1933, Serial No. 694,584

64 Claims. (Cl. 200—126)

My invention relates to a method of and means for opening a circuit subject to overload and thereafter automatically reclosing the circuit.

While the specific embodiment which I shall herein describe and illustrate in compliance with the requirements of the statutes employs a fuse as the element for detecting the existence of overload, and initiating the operation of the device, it is to be understood that this feature is incidental to the preferred embodiment, and not necessary for all embodiments of the invention. The use of a fuse permits of maximum simplicity of construction and operation. It provides the best mode now contemplated of applying the novel principles embodied in my invention, but I do not wish to limit my invention to that mode only.

In the distribution of electrical power, continuity of service has become a great factor. Service interruptions on power transmission or distribution lines occur from various causes and under various conditions. A large majority of interruptions to service are caused by the occurrence of temporary or transitory overloads.

Fuses, circuit breakers, or such other safety devices as are in common use are generally designed to open the circuit promptly upon the occurrence of overload, to avoid extending the service interruption toward the source of power. They best serve their function as protective devices in causing interruption of current flow as quickly as it is possible to determine the existence of current flow in excess of that which it is safe for the line to carry. Since they are intended and designed to operate as soon as the current has attained an excessive value, they are not able to differentiate between a temporary or transitory overload or short, and a permanent one.

It is found, however, that in a large percentage of such interruptions of service, or outages, the cause is only temporary, such, for example, as wires swinging together, a tree limb which in falling to ground comes across the lines, flashover of an insulator due to a voltage surge produced by atmospheric electricity, or switching operations on connected circuits, etc. Hence, if a line is protected by a device without reclosing characteristics, the service is interrupted by any overload, even if self-clearing in character, and when the trouble man comes on the job to reestablish service he finds that the trouble has cleared itself and no longer exists.

Automatic reclosing oil circuit breakers have been provided for meeting these conditions and it has been found that breakers which reclose from three to five times stay closed upon the first reclosure in probably 80% of all cases of operation. Also, it has been found that circuit breakers which are arranged to close twice after the first interruption will reestablish service in about 90% of all cases, and will thereby maintain continuity of service.

Such circuit breakers for this service as have been developed are expensive in first cost. They involve complicated mechanism.

Attempts have been made to develop fuse installations for this service. All attempts in this direction of which I have information involve apparatus both mechanical and electrical which is exposed to atmosphere or other external influences which render the devices unreliable. As a result, their application and use is greatly limited. Also, all such reclosing fuse devices of which I have information have their contacts brought together in the open, or in air, with the result that the contacts tend to burn and sometimes weld together. Also, the rapid engagement in air of contacts carrying heavy current is likely to cause vibration or bouncing, with resultant arcing, pitting, and injury to the contact surfaces.

In oil circuit breakers of the reclosing type, more or less elaborate overload detecting devices are employed. These are generally of the electromagnetic type. In a fuse device the fuse itself serves as the overload sensitive device. Where fuses are employed it is necessary to shift the connections from one fuse to the next, and to do this reliably and simply has heretofore not been found possible.

According to the present invention I provide a simple and reliable reclosing device for the service above described.

In the preferred form it employs a fuse as the sensitive element for detecting overload and tripping the moving parts or initiating the opening of the circuit. The fuse also initiates the operation of switching the circuit to the succeeding fuse.

According to one phase of my invention the opening on overload and subsequent reclosing of the circuit is accomplished by the motion of a part which first interrupts current flow and continues in its travel, subject to an intermediate time delay, to perform a switching or reclosing operation, bringing into circuit another or alternative device. The primary duty of the device is to open the line upon the occurrence of overload. The secondary duty is to reclose the line after a predetermined interval, through a second protective or interrupting device.

An important feature of novelty of my invention is the utilization of a single shiftable member in the dual capacity of opening the circuit at one point and subsequently reclosing it at another point. In the forms herein shown this shiftable member is in the form of a rod which leaves one terminal to break the circuit and travels endwise away from said one terminal toward a second terminal to close the second circuit.

A further feature of novelty resides in the provision of a timing element for governing the delay between the operation of circuit interruption and the operation of circuit closing through another branch. In the preferred form of the invention this is secured by the provision of a dashpot and lost motion connection of the rod or movable member relative thereto. Obviously any other timing device, such as a mechanical escapement, may be utilized.

A further feature of novelty resides in the enclosure of the operating parts which interrupt the circuit and reclose it within a housing. This housing may be an elongated tubular housing convenient to manufacture and use. Preferably it consists of a cylindrical shell of insulation bearing external terminals such as caps or ferrules. This permits of convenience in installation and permits of a simple, inexpensive mounting.

Further features of novelty reside in the specific construction and arrangement of certain of the operating parts, namely:—

First, the use of an intermediate terminal of ring-like form, which provides connection through the operation of the contained shiftable element with either the upper ferrule for the initial current, or the lower ferrule for the reclosure;

Second, the use of a coil spring and a concentric rod or tube to produce the necessary travel and to provide a compact and efficient structure;

Third, the construction of the timing or dashpot mechanism for checking the motion of the shiftable member through a part of its travel in order to provide a time interval between interruption of the circuit and reclosing;

Fourth, accelerated motion of the movable contact on closing the contacts allows them to close together rapidly, thereby reducing the time during which an arc could jump across the approaching contacts. In the present structure these contacts approach each other under short circuit conditions;

Fifth, utilizing the same fluid dielectric for arc extinguishing and for the working medium of the dashpot; (when an arc extinguishing liquid is employed, it serves the additional function of preventing arcing at the reclosing contacts);

Sixth, the construction of the reclosing contact and particularly the guide to prevent bouncing or chatter of the reclosing contacts;

Seventh, provision of means for permitting displacement of liquid out of the reclosing part of the device and for escape of gases from said part.

There are other features of novelty which will appear from the following detailed description and the drawings hereto attached, and forming a part of this specification.

In the operation of the device, the following actions take place:—

First, there is the detection of excessive current flow. When a fuse is employed this is accomplished by softening or melting of the fuse.

Second, the forming of an arc. This is the result of either vaporization of the fuse where a fuse is employed or the separation of current carrying contacts where interruption is between switch contacts.

Third, extinguishing the arc. This is done preferably by moving one of the contacts away from the other and simultaneously driving the ionized gases and vapors out of the arc space and substituting a better dielectric.

Fourth, interposing a safety gap. This is done by continuing the motion of the movable electrode.

Fifth, interposing delay before reclosing. This is accomplished by checking the motion of the movable electrode as by causing the dashpot to become effective.

Sixth, closing the reclosing switch. This is done by discontinuing the dashpot action and plunging the movable electrode into engagement with the reclosing electrode or contact.

These actions may be accomplished by means structurally different from the means herein shown, as I do not wish to limit the invention to specific details except as they are important to the attainment of the functions involved, and then only as recited in the appended claims.

The number of reclosures may be varied, and the mechanical position of the reclosing units may be varied within my invention.

Now, in order to acquaint those skilled in the art with the manner of constructing and operating a device embodying my invention, I shall describe in connection with the drawings a specific embodiment of the same.

In the drawings:—

Figure 8, in three parts, is a longitudinal section through the unit fuse and switch of my invention. Part I shows the fusible link and its connections for opening the circuit. Part II shows the shiftable contact of the switch element and the dashpot device, and part III shows the lower switch contact and external terminal.

Figure 9:
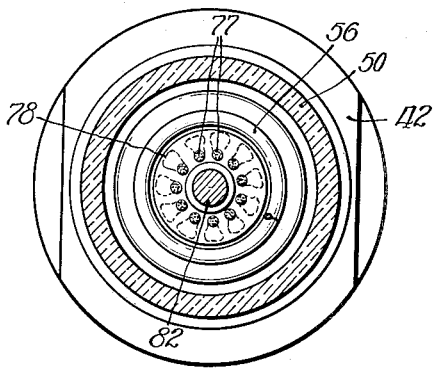
Figure 11:
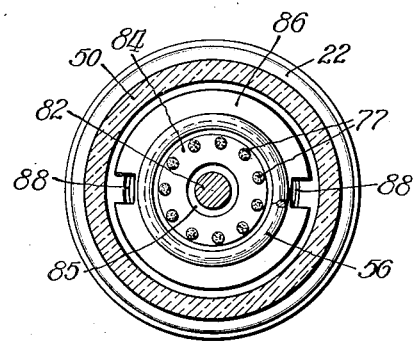
Figure 10:
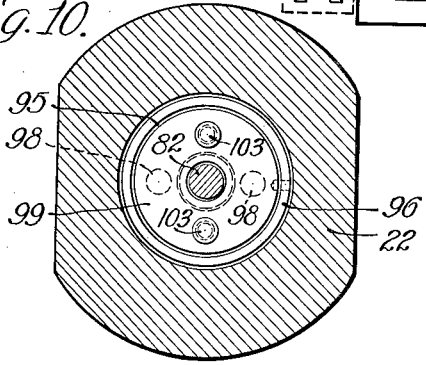
Figure 12:
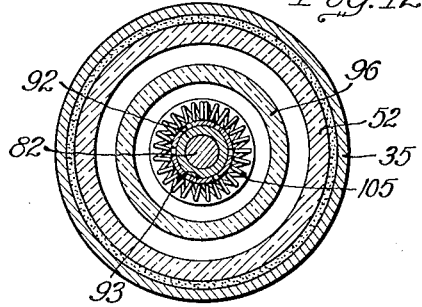

Figure 9 is a cross section taken on the line 9—9 of Figure 8, part I, looking in the direction of the arrows;

Figure 10 is a similar cross section, taken on the line 10—10 of Figure 8, part II;

Figure 11 is a similar cross section, taken on the line 11—11 of Figure 8, part II;

Figure 12 is a similar cross section, taken on the line 12—12 of Figure 8, part III;

Figure 13, in three parts, shows, in vertical section, an air expulsion fuse constituting a modification of the unit fuse and switch of my invention. Part I shows the stationary switch contact. Part II shows the movable switch contact and dashpot plunger and the spring for moving the common movable switch and fuse plunger. Part III shows the air expulsion fuse and its connection to the movable terminal and the stationary terminal.

Figure 16:
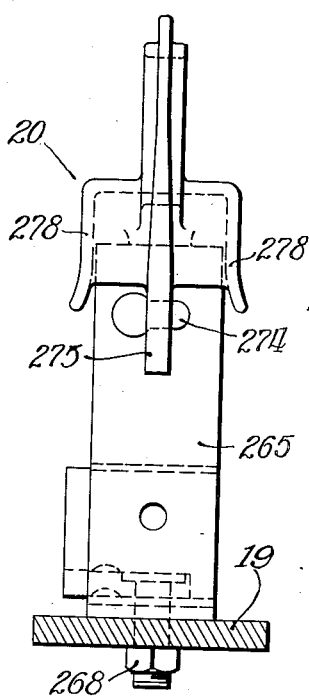
Figure 17:
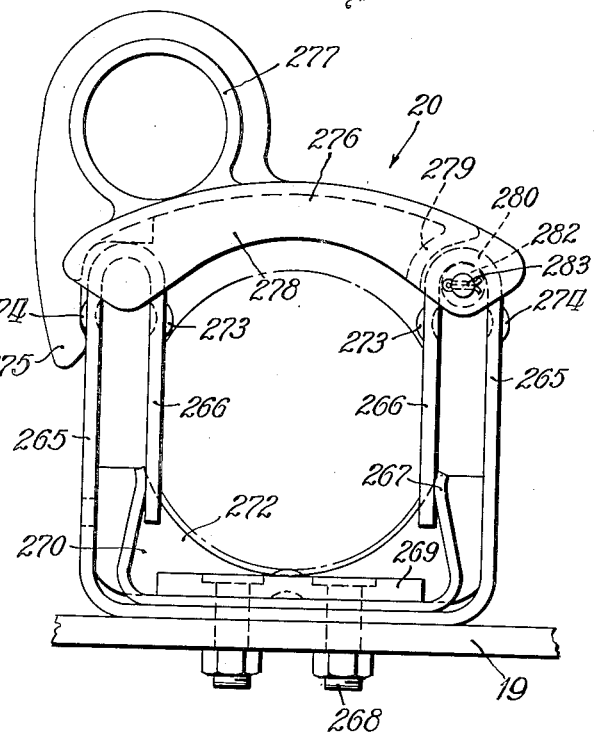
Figure 18:
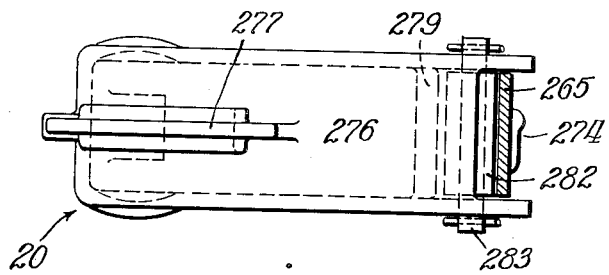

Figure 14 is a longitudinal section through the air expulsion fusible link shown in Figure 13;

Figure 15 in two parts shows a further modification of an air expulsion type of fuse and switch unit embodying my invention. The upper switch contact is not shown, but it will be understood that it is like the switch contact of Figure 13, part I; and Figures 16, 17 and 18 are front and side elevations and a top plan view, respectively, of a spring clip or contact for mounting the units.

Figure 1:
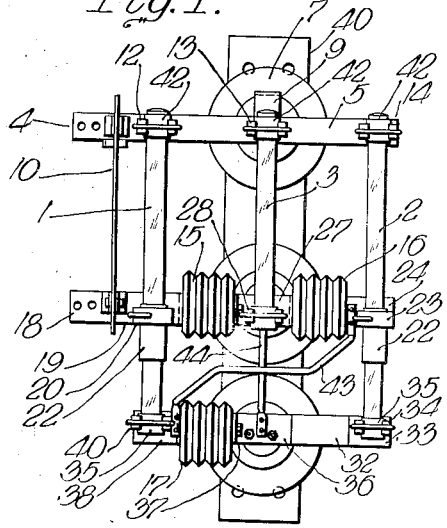
Figure 1 is a front elevational view of an embodiment of my invention.
Figure 2:
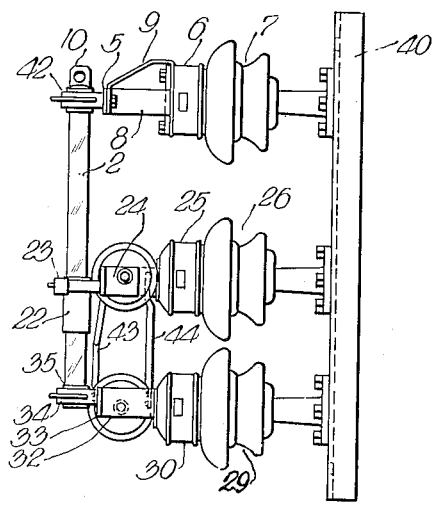
Figure 2 is a side elevational view of the same.
Figure 3:
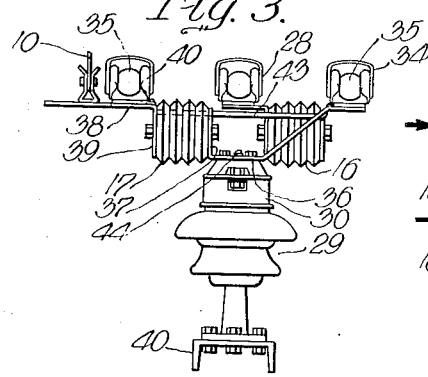
Figure 3 is a bottom plan elevational view taken from the bottom of Figure 1.

Referring first to the installation shown in Figures 1 to 3 and the fuse and switch units shown in Figures 8 to 12, I provide a mechanism the purpose of which is to interrupt the circuit automatically upon a rise of current to a value in excess of a predetermined amount, thereafter, after a predetermined period of time, closing the circuit through another protective device, which will remain closed if, in the meanwhile, current flow has been reduced, but which, if current flow is still excessive, will automatically interrupt the circuit, and, after a predetermined period, connect in a third safety device to close the circuit which is capable of interrupting the circuit if the current flow is still above a predetermined value. The same principle of operation may be embodied in any desired number of reclosures.

The three protective devices 1, 2 and 3 are preferably, but not necessarily, fuse devices. In the specific embodiment shown, these units are all completely enclosed and the switching is done internally. Units 1 and 2 are fuse and switch units, and are identical. Unit 3 is a fuse unit only, hence, in the specific embodiment, it is the last protective device to be included in the circuit. Obviously, within my invention, any number of safety devices may be employed.

The incoming line connection is made at 4 to a transverse bus bar 5 which is supported upon the cap 6 of insulator 7 by a pair of divergent arms, one of which is shown at 8, and a central arm 9. The two arms 8 and the central arm or bracket 9 space the bus bar 5 away from insulator cap 6 to bring the fuse clips 12, 13 and 14 in alignment with other fuse clips later to be described, allowing room for the transverse insulators 15, 16 and 17. The outgoing, or load connection 18 is made to a flat conductor of L-shape, the body of which, indicated at 19, lies in the same plane as the incoming line bus 5. The circuit may run either way, i. e., either in at 5 and out at 18, or vice versa. The base or right angle portion of conductor 19 extends downwardly in Figure 1, that is, normal to the plane of the paper, and is bolted to the left-hand end of the horizontal insulator 15. A special clip or spring contact 20 is mounted on the body portion 19 and it receives and makes contact with the metallic ferrule 22 of the unit 1. The unit 2 has a similar intermediate ferrule 22 and it also is engaged by a special clip or spring contact 23 which is like the contact 20 hereafter described in detail.

The contact 23 is mounted on an L-shaped conductor 24 the body of which lies in the plane of the bus bar 5 and the load connection conductor 19. The foot of the bracket member 24 is bolted to the end of the horizontal insulator 16. The two horizontal insulators 15 and 16 are mounted upon the cap 25 of the petticoat insulator 26. The connection is made by a rectangular bracket member 27 which has a horizontal portion in the plane of the parts 19, 24 and 5 in order to support the spring clip contact 28 for making connection with the lower ferrule of the fuse unit 3. This bracket member 27 likewise has two right-angle portions which are bolted to the ends of the insulators 15 and 16 and it has a bottom portion which is bolted to the cap 25 of the insulator 26. The lowermost insulator 29 has a cap 30 upon which is supported a bracket of flat stock. This bracket 32 has a portion 33 lying in the plane of the parts 24, 19 and 5, and it supports the spring clip 34 for making connection with the lower ferrule 35 of the unit 2. The base of the bracket member 32 is indicated at 36. It is bolted to the cap 30 of insulator 29.

A right angle mounting portion 37 extending upwardly from the plane of the paper in Figure 1 is bolted to the right-hand end of the horizontal insulator 17 in order to support the same. At its left-hand end the insulator 17 supports a bracket comprising the horizontal portion 38 which lies in the plane of the parts 19 and 5 and a foot portion 39 which is bolted to the left-hand end of the insulator 17. The horizontal portion 38 supports the spring clip 40 for making contact with the lowermost ferrule 35 of the unit 1. The clips are thus arranged in true aligned groups for the three units 1, 2 and 3.

The three insulators 7, 26 and 29 have their pins bolted to a support which, in this case, is a piece of channel iron 40.

The units 1, 2 and 3 have their upper ferrules 42 (and these are substantially all alike), connected by their respective spring clips or contacts 12, 14 and 13, to the incoming line connection bus 5. The intermediate ferrule 22 of the unit 1 is connected by its spring contact member 20 to the outgoing line connection or load connection 18. The lowermost ferrule 35 of the unit 1 is connected to the intermediate ferrule 22 of unit 2 by a conductor 43 the ends of which are secured, as by screws or bolts, to the bracket portions 24 and 38. The lowermost ferrule 35 of the unit 2 is connected to the lowermost ferrule of the fuse unit 3 by a conductor 44 which is bolted to the bottom 36 of the bracket 32 and to the bottom of the bracket 27. A short-circuiting switch 10 has its contacts mounted on the incoming line bus 5 and on the outgoing line or load conductor 19, the free contact being mounted on the conductor 5 and the other contact being mounted on the conductor 19. The purpose of this switch is to connect line terminals 4 and 18 together for closing the line to the exclusion of the units 1, 2 and 3. This is particularly useful on re-fusing the device.

Figure 4:
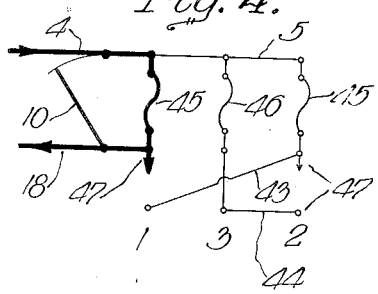
Figure 4 is a diagram of connections of the device conditioned for fusing the first fusible link. This diagram shows the device in initial condition.
Figure 5:
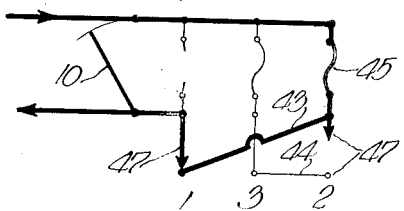
Figure 5 is a diagram showing the connections after the first link has blown, and the second link has been switched into circuit.
Figure 6:
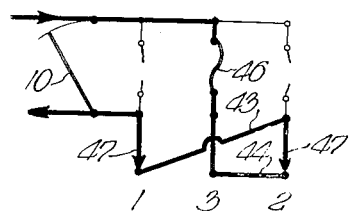
Figure 6 is a similar diagram showing the connections after the second link has been blown and the third link has been connected into the circuit.

The connections are indicated in diagram in Figures 4, 5 and 6.

Units 1 and 2 each comprise a fusible link 45 and a normally open switch 47. The unit 3 comprises a fusible link 46 but has no corresponding switch. When the device is initially installed the units 1, 2 and 3 are connected in place and the short-circuiting switch 10 is open. The switch 10 is closed only when units 1 or 2 or both are to be replaced, in order to prevent interruption of the service as the removal of an operated unit would otherwise break the circuit. Upon the occurrence of overload conditions necessitating opening of the circuit for protection of connected apparatus the fusible link 45 of the unit 1 is fused and the arc is extinguished, as will be described later. The common moving terminal of the fuse and switch begins to descend as soon as the fuse is melted and opens the arc gap of the fuse quickly, then it is delayed in its motion and finally, after a predetermined period which is suitable to ascertain whether or not the line will clear itself, and preferably of such short duration as not seriously to interfere with connected rotating machinery, particularly of the sensitive type, the switch contacts 47 of the unit 1 are closed. This, through the connection 43, then switches the fusible link 45 of the element 2 into the circuit and the connections are then as shown in Fig. 5. If the overload persists, necessitating further disconnection, the fuse 45 blows, the common moving terminal quickly widens the gap, and the arc is extinguished. Thereafter, with an intervening period of time, the switch contacts 47 are quickly closed and through the connection 44 the fusible link 46 of the unit 3 is connected in series in the line. The connections are then as indicated in Figure 6. If the overload still persists the fuse 46 blows and the gap is widened, the arc is extinguished, and the circuit then remains open.

The spring clips such as 12, 13 and 14 are preferably of the type disclosed in Conrad Patent No. 1,743,322. The insulator caps such as 6, 25 and 30 are preferably, but not necessarily, of the type shown in the patent to Ramsey, No. 1,767,398. The fusible links are preferably of the type which are opened by spring action, and provided with arc extinguishing medium in the general manner known in the trade in connection with the "S & C" liquid quenched fuse, although they may be of the type disclosed in the patent to Ringwald, No. 1,652,317, involving a solid arc extinguishing material, or it may be of the air expulsion type shown in the copending application of Allan Ramsey, Ser. No. 671,660, filed May 18, 1933. By reference to the above particular devices I do not intend to limit the disclosure merely referring to the above as suitable structures adaptable to the present use.

In order that the operation of the units 1 and 2 may be more readily comprehended, and that the structure thereof may be clear, I have shown in Figs. 8 to 12 the details of construction of a specific embodiment suitable for use in the installation of Figs. 1, 2 and 3. The unit 3 is preferably a fuse of the above mentioned type or, more specifically, it may be constructed as shown in the copending application of Conrad, Ser. No. 470,416, filed July 24, 1930. The unit 1 comprises an upper ferrule 42, an intermediate ferrule 22, and a bottom or lowermost ferrule 35. Between the ferrules 42 and 22 extends a glass sleeve 50 which is seated in counterbores in the ferrules 42 and 22 and cemented therein to provide a fluid-tight joint, mechanically rigid. Between the ferrule 22 and the lower ferrule 35 extends a glass sleeve 52 which likewise is seated in counterbores in the said ferrules and rigidly cemented thereinto.

The fusible link portion generally designated by the reference numeral 45 in the diagram of connections of Figs. 4, 5 and 6, includes details of construction which are substantially identical, as herein shown, with the structure disclosed in the above copending Conrad application, Serial No. 470,416. This comprehends, in general, the following construction:—A silver fuse wire 53 is connected between the round brass metal studs 54 and 55, the former comprising a stationary terminal, the latter a movable terminal. The stress produced by the tension spring 56 upon the movable terminal 55 is not taken upon the silver fuse wire 53 but instead is carried by a high-tensile strength, high resistance nickel-iron-chromium wire 57 which is provided with loops at its ends extending axially in bores in the terminals 54 and 55 and cross pins extend through the said loops to anchor the ends of the so-called "strain wire" 57. The silver fuse wire 53 is coiled about the strain wire 57 and has its ends mechanically and electrically secured to the terminals 54 and 55. The upper terminal 54 has a threaded stud 58 which passes through a contact plate 59 and is held by a nut 60. The contact plate 59 has a flange which is slotted to provide spring fingers 62 fitting within a counterbore 63 in the upper ferrule 42. The spring fingers of the flange 62 rest endwise against a shoulder which is formed by inwardly projecting flange 64. The flange 64 is internally threaded and carries a plate of insulation 65 which is generally termed the barrier plate, this being preferably made of insulation. The barrier plate is apertured at its center and, in turn, carries a tube of insulation 66 providing an explosion or arcing chamber 67. The upper end of the tube 66 is provided with a short flange which fits in a counterbore in the barrier plate 65 and is held in place by washers 69 held in place by pins 68 having heads overhanging the washers, the washers in turn overhanging the end of the flange of the tube 66. The lower terminal 55 extends into the lower end of the tube 66 and the fuse 53 and its strain wire 57 are contained substantially within the arcing chamber 67. The plate 59 is apertured by a number of openings and the chamber which is formed above the arcing chamber is adapted to receive and, under certain conditions, retain the products of the arc formed upon melting of the fuse and strain wire. This chamber is closed by a releasable vent cap 70 which is cemented over the end of the ferrule 42 with a predetermined yielding value, to retain the products of blowing of the fuse if possible and, if not, to release upon the occurrence of excessive pressure and to vent the explosion chamber 67 to atmosphere or to an enclosed space of suitable character.

The movable terminal 55 carries with it a liquid director 72 fitting loosely within the glass sleeve 50 but serving, upon descent of the terminal 55, to project arc extinguishing liquid into the arcing chamber 67. Preferably, the entire internal space of the device is filled with liquid up to the level L shown in part 1 of Figure 8. The liquid director 72 is carried by a plurality of pins 73 projected radially outwardly into a groove formed in the interior wall of the liquid director 72. The stud 55 has an integral enlarged shank or body portion 74 providing a shoulder. Upon the annular shoulder formed on the shank or body portion 74 rests a flange 75 of the spring anchor 76. A split snap ring 71 is positioned in a suitable groove in the shank 74 to prevent the latter from moving downwardly relative to the spring anchor 76, which movement might be caused by the pressure created on melting of the fuse wire 53 and strain wire 57 under heavy overload conditions. This spring anchor is a cylindrical sleeve member having spiral grooves on its outer surface to receive the upper convolutions of the spring 56. The spring 56 is threaded by flexible copper braids 77. These braids are stranded wires which extend endwise through holes drilled in the nut 78 and have their ends pinched between the thread nut 78 and the locking nut 79, both of the parts 78 and 79 being threaded upon the upper threaded end 80 of the rod 82. The nut 78 is threaded against the shoulder formed on the upper end of the rod 82, the flexible conductors 77 extend through the nut 78 and have their ends turned out radially and clamped by the lock nut 79 which is then pinned against rotation. The upper end of the threaded stud 80 extends into a threaded socket in the shank 74 of the upper terminal 55. The terminal 55 may be a removable tip separable from the shank 74, if desired. The rod 82, which is a conductor, preferably a rod of copper or brass, has its main length of reduced diameter to provide a portion of larger diameter which may be termed an enlargement 83. This enlargement has a distinct purpose which will be described more in detail later, namely, a guiding function in the lower spring anchorage, and a valve closing function in connection with the dashpot.

The lower end of the tension spring 56 is connected to a spring anchor 84; this spring anchor comprising a cylindrical portion which, upon its exterior periphery, has helical grooves for receiving the lower convolutions of the tension spring 56. A central opening 85 is provided to permit the passage of the rod 82 therethrough. The spring anchor 84 is drilled endwise to receive the lower end of the flexible conductors 77, the ends of said conductors 77 being turned out radially and clamped against the end of a threaded ring or plug 86. The spring anchor 84 has a tubular neck which extends down through the ring 86 and said ring 86 is counterbored to receive an internally threaded collar 87 threaded onto the neck of the spring anchor 84 to hold it firmly in place and to clamp the ends of the flexible conductors 77 between said spring anchor 84 and the upper face of the threaded ring or plug 86. The threaded ring or plug 86 is threaded into the upper end of intermediate ferrule 22 to provide good electrical conductivity between said flexible conductors 77 and the intermediate ferrule 22. The flexible conductors, in turn, make good electrical connection of low resistance with the lower fuse terminal 55 and with the rod 82. The threaded ring or plug 86 is slotted to provide a plurality of longitudinally extending ports 88 so that communication is provided between the chamber 89 formed above the intermediate ferrule 22 and chamber 90 formed below the intermediate ferrule 22. The lower end of the rod 82 carries a switch contact 92 which is threaded upon the rod. This contact 92 is adapted to plunge into and make engagement with the stationary switch contact 93 secured in a boss 94 on the interior of the lower ferrule 35 which has an end wall closing the same. In other words the ferrule 35 is in reality a closed cap.

In the intermediate ferrule 22 below the upper threaded portion which receives the ring or plug 86 the bore is cylindrical to form the chamber or cylinder of the dashpot. The piston of the dashpot, indicated at 95, is formed of two parts, namely, a sleeve 96 and a head 97. The piston is made self-guiding by thus extending its length through the use of the sleeve 96. The head 97 has a plurality of ports therethrough, one of which is shown at 98. A flat disc valve 99 cooperates with the port 98. This disc valve 99 has a guiding neck 100 to guide the valve upon the rod 82. The valve is held in raised position normally by a coiled spring 101 which is compressed between the spring head or tip 92 and the said guiding neck 100, a suitable washer 102 being interposed between the upper end of the spring and said guiding neck. The disc is held against separation from the plunger by a pair of headed pins 103 (see Figure 10) which have their lower ends fastened in the head 97 and have their intermediate portions passed through holes in the disc 99. It is desirable that the valve 99 remain away from the ports 98 so that gas, for example air, which may find its way into the lower compartment 90 may gravitate out of said compartment 90 and rise into the upper compartment above the liquid level. As soon as the dashpot is to be called into play, the valve is to be closed and this is accomplished by the enlargement 83 passing down through the central opening 85 in the lower spring anchor 84 and engaging the disc 99 and forcing it against the head 97, closing the passageway of openings 98 through said head.

The plunger 95 of the dashpot is guided within the bore in the intermediate ferrule 22 but as soon as the head 97 passes out of said intermediate ferrule 22 it passes into the larger part of the chamber 90, which is of an internal diameter substantially in excess of the plunger 95, with the result that the dashpot action becomes substantially ineffective. The action of closing the valve 99 upon the ports 98 and head 95 is shown in dotted lines in part 3 of Figure 8. The lower switch terminal 93 comprises a plurality of spring fingers integral with the stud portion 104 or rigidly connected thereto, these spring fingers having a circumferential groove on their exterior in which rests a coil spring 105 for contracting the spring fingers for engagement with the switch contact 92 on the lower end of the rod 82. The spring fingers have an inwardly extending bulge which provides a suitable ring pressure for engagement with the movable tip 92, the tip being stopped by engagement with the bottom of the contact 93 as is indicated in dotted lines in Figure 8, part 3.

I have found it desirable, in closing the switch contacts, to prevent striking and chattering or bouncing of the contacts, since with heavy current flowing that is most destructive of the contacting surfaces and also it tends to evolve gas, which, in a device of limited capacity, is undesirable. I provide a guiding ring 106 of suitable insulation, such as "Bakelized" fiber, or "Bakelite", which is held in place by a groove on the lower outer periphery engaged by hooks or inwardly extending portions formed on the upper ends of the spring fingers of which the contact 93 is composed. The sleeve 96 of the dashpot encircles the lower contact, as shown in dotted lines in part 3 of Figure 8, only after the contacts are closed and the said dashpot drops down through the liquid. The insulating guide ring 106 is funnel-shaped to guide the movable contact 92 in place. It is not a contracting or expanding ring but a solid ring, and is held in place merely by the grip of the hooks on the upper ends of the spring fingers under the influence of the coil spring 105 which is a helical spring with the ends thereof hooked together and surrounding the spring fingers of the contact 93 (see Figure 12). Obviously the construction of the guide ring may be modified as by dividing it or even providing separate extensions on the fingers of the contact 93. I believe it is broadly new to have such a guide of insulation for bringing two switch contacts together for closing a circuit under heavy load. The contacts are not separated under load, hence the guide is never burned.

The operation of the unit shown in Figure 8 and the manner in which that operation affects the operation of the installation shown in Figures 1 to 3 will now be explained.

The entire unit is filled with liquid up to approximately the level L shown in Figure 8, part 1. This level may be slightly higher or lower without affecting the operation of the device. It is preferable that the liquid be kept out of contact with the fusible link both in order to avoid any influence upon the time-current characteristics, and also to keep the heat of the fuse away from the liquid. Assume that the parts are as shown in solid lines in Figures 1 and 8, current from the line lead 4 passes through the line bus 5, through the spring clip 12 and to the ferrule 42. From here the conduction of current is through the spring fingers 62, the plate 59, to the stud or upper link terminal 54. From thence current flows through the fuse wire 53 and in small degree through the strain wire 57 to the lower terminal or arcing tip 55, which is connected through the shank or body 74 and rod 80 and nuts 79 and 78 to the flexible cables 77. From thence current flows down to the lower spring anchor 84, in which the lower ends of the flexible cables 77 are connected, to the ring or plug 86 and thence to the intermediate ferrule 22. At this time the fact that the rod 82 and the switch tip 92 are live, that is, connected to the circuit, is of no consequence since the rod is out of contact with the guide formed by the lower spring anchor 84 and the tip is in contact only with the movable plunger of the dashpot, this movable plunger 95 being of insulation and hence no current flows through the rod 82 at this time. Obviously, the rod 82 might make connection between the arcing terminal 55 and the intermediate ferrule 22, but that is of no consequence since the flexible cable 77 is of very low resistance in order to put the said parts 55 and 22 in good electrical connection.

Assuming that the short-circuiting switch 10 is open, all of the current flow between the terminals 4 and 18 passes through the fuse element, including the link 53 and its strain wire 57. If an overload occurs, and this may be either a short circuit in which a very large current flow immediately develops or it may be a fault of a character in which the current flow is limited, the fusible link is melted, releasing the terminal 55. As soon as the fuse is melted it is, of course, pulled apart and the arc which follows produces metallic vapor. The pressure of the arc extinguishing liquid causes an upward travel of the products of the arc. Since the device is sealed fluid-tight, the inside of the arcing chamber 67 is substantially wet with liquid at all times and instantly upon the formation of an arc some of this material is vaporized and the metallic vapors and the arc extinguishing medium thus evolved, or evolved by injected liquid, drives the products of the arc into the upper chamber above the arcing chamber 67, where they are removed from possible influence upon the conductivity between the terminals 54 and 55. If the overload is not severe this action of endwise expulsion of the products of the arc may suffice for interrupting current flow. If not, the continued injection of liquid and the action of the arc upon the same may increase the pressure within the device to a point where the cap 70 is blown off, providing for release of pressure to atmosphere or to an enclosed space of a suitable character. The injection of liquid by descent of the plunger, including the liquid director 72, increases the length of the arc gap and continues to scour out the products of the arc, substituting fresh arc extinguishing medium for the products of the arc, with the result that in a short travel of the lower terminal the arc is extinguished. This downward travel of the plunger, including the rod 82 is accomplished with relatively rapid motion. This brings the enlarged portion 83 down into the guide opening 85 in the lower spring anchor 84 and then causes the said enlargement 83 to engage the valve disc 99 to close the same over the valve ports 98. This makes the dashpot effective to retard the downward motion of the plunger towards switch closing position. The length of time that the dashpot piston 95 travels in its cylinder and the degree of clearance between the piston and the cylinder, may be so selected as to provide the desired time interval between the rapid fuse quenching operation, that is, current interrupting operation, and the rapid plunging of the switch contacts together, that is, the circuit closing operation. This interval may be made such as to allow a matter of 15, 30, or 45 cycles as the time delay between opening of the circuit and reclosing the same. This would involve, in terms of time, from one-quarter, one-half to three-quarters of a second. I do not wish to limit the time intervals to such short periods, for the delay may be a matter of three, four or five seconds, or a time of that order. It is, however, highly desirable that this time period be definite and uniform after it is once determined. When the lower contact 93 is engaged by the plunger contact 92 the circuit is then closed from the line connection 4, line bus 5, spring clip 14 of unit 2, through the unit to the intermediate ferrule 22 of unit 2, thence through the external conductor 43 to the lower ferrule 35 of unit 1 and through the closed switch contact 93 and 92 up through the rod 82 to the upper end of the rod, flexible conductors 77 and thence to the intermediate contact 22 which is connected to the load terminal 18. Unit 2 operates in the same manner as unit 1 upon the flow of excess current therethrough. That is to say, if the fault has not cleared itself, then unit 2 operates through fusing of its fusible link, rapid descent of the plunger to lengthen and extinguish the arc, then a delayed descent through the action of the dashpot, then finally a rapid closing together of the contacts when the dashpot becomes ineffective and thereby switching in unit 3. Unit 3 is a fuse only, inasmuch as it requires no switching operation for a succeeding unit, hence its operating parts are merely like the upper parts of units 1 and 2 in that it contains the fusible link, terminals and spring, together with the arc extinguishing liquid or other medium for insuring extinguishment of the arc.

It is to be observed that the descent of the plunger in the liquid performs a highly desirable function of disconnecting and separating and interposing a dielectric medium between the fuse terminals, so that there is no possibility of establishing either normal current flow or leakage through the blown fuse.

The dashpot provides an accurate timing device. Where timing is relied upon as to reclose within a definite interval less than that required for other protective devices such as low voltage trips or controllers for rotating apparatus on the line, it is highly important that the interval be accurately determinable, and that it be not greatly varied. I have found a dashpot to be preferable to all methods with which I am familiar, but obviously I do not wish to limit the timing device to this specific device, as any equivalent device, such as a reciprocating or pendulum escapement, or rotary brake, or the like, which will give satisfactory delay to the reclosing operation, is considered as coming within my invention.

Within my invention, sufficient delay may be secured without any specific timing device. Sequence of the two operations, i. e., interruption and reclosing, is essential. The special timing device is optional.

It is not desirable to use solder in making electrical connections in a device of this type. This is particularly true where the parts are adapted to be retained in the circuit after the fuse has blown.

Whereas the fusible link and its arcing chamber, as shown in Figure 8, are for relatively heavy current, it is to be understood that for lighter current a form of fusible element and connections such as shown in Figure 1 of Conrad Patent 1,743,322 or Ramsey Patent 1,907,581 may be employed.

It is to be observed that in the form of the fuse-switch unit above described the intermediate ferrule member 22, which is made of metal, provides the dashpot cylinder. The construction so provided is particularly advantageous where glass sleeves are employed, and in this connection attention is called to the fact that the lower end of the intermediate ferrule 22 is provided with an annular groove into which the upper end of the glass sleeve 52 projects and is cemented, a suitable cement for this purpose being a metal alloy as disclosed in the patent to Conrad, No. 1,665,445.

While in the foregoing form of the fuse switch unit the dashpot is formed in the intermediate ferrule, it is to be understood that this is not essential in all forms of my invention but it is particularly useful for the liquid quenched type. In the air-filled unit shown in Figure 13, the wall of the chamber itself may form the dashpot cylinder. Also, as I shall show in Figure 15, a separate cylinder for the dashpot may be provided and inserted within the device.

In the embodiment of Figure 13 the fuse is of the so-called expulsion type, that is, it is blown and extinguished in air. In this embodiment the fuse is preferably placed at the lower end of the unit, the fusible link being indicated at 144, Figure 13, part III. The fuse has an upper terminal comprising a cylindrical fitting 145 which has a threaded stud 146 at its upper end adapted to thread into the inside of the lower end of a tube of copper or other good conductive metal, as shown at 147. This tube constitutes an essential of the plunger element which serves the dual function of opening the arc gap and closing the switch in predetermined order and subject to a suitable time delay.

The lower end of the fusible link 144 comprises a terminal 148 which has a socket 149 swaged upon or otherwise connected to a flexible cable 150. This cable 150 has a tapered conical ferrule 152 swaged or otherwise secured thereupon, and it fits into a conical socket or seat formed at 153 on the lower end of a bracket 154 extending from the ferrule 155. The ferrule 155 is seated upon the insulating sleeve or tube 156 which forms a housing or container for the expulsion fuse. The bore of the tube 156 is made relatively small, so that a violent expulsion action is secured for throwing out the lower end of the fusible link and its connected terminal. The sleeve 156 is preferably formed of a material such as "Bakelized" fiber or horn fiber or the like, and it is preferably lined with a fiber or paper liner 157 which may be impregnated with an arc extinguishing material which, under the action of the arc, yields a gaseous arc extinguishing medium assisting in putting out the arc and interrupting the current flow. At its upper end the tube 156 is provided with a threaded split metallic ring 158 which is set in a groove and pinned to the upper end of the said sleeve 156 for threading the upper end of the sleeve into the metallic ferrule or ring 159. Threads formed upon a fiber tube are not generally satisfactory, particularly under heavy stress or when the threads are to be released and again tightened and a metal insert laid in a groove in the upper end of the tube 156 is in this case provided. The ring or ferrule 159 is preferably made of brass or other high conductive metal. It has an annular recess cut axially into the upper side to provide first a threaded wall 160 for receiving the threads on the lower end of the tube 162. A metal insert for the end of the tube 162 may be formed, although, in the case of the larger size tube a fairly coarse thread will be sufficient, inasmuch as no great mechanical stress is imposed upon these threads. Drill holes extending axially in the central boss 164 provide sockets for receiving the lower ends of the flexible stranded leads 77. These leads are secured by pinching the metal walls of the holes upon the ends of the flexible leads. The annular recess also provides a seat for the lower end of the compression spring 165. The coiled compression spring 165 bears at its upper end against the bottom of the piston 166. This piston comprises a main cylindrical body portion 167 which is adapted to fit closely within the tubular bore of the sleeve 162 to form a dashpot providing the delayed motion of the movable plunger. This body portion 167 may be made of a suitable material such for example as "Bakelite", or it may be made of graphite to reduce friction with the walls of the cylinder. The body portion 167 surrounds a flanged metal sleeve member 168. The flange 169 bears against the upper end face of the body portion 167 of the piston and a flanged nut 170 is threaded upon the lower end of the said sleeve 168 and bears against the lower end face of the body 167. The upper end of the spring 165 bears against the flange of the nut 170 and tends to thrust the piston and the entire plunger member upwardly. A tubular contact member 172 which forms a part of the reclosing switch, is threaded into the upper end of the sleeve member 168 and makes electrical contact therewith. The extreme outer end of the contact member 172 is rounded or tapered to assist it in being guided into contact with the stationary contact member 173 which is mounted at the upper end of the sleeve 162 electrically in connection with the ferrule 174. The ferrule 174 is closed at its upper end, constituting a cap, and this cap is threaded upon the upper threaded end of the fiber sleeve 162.

The flanged nut 170 is drilled axially to receive the upper ends of the flexible leads 77, the walls of the opening being collapsed upon the ends of the cables to make electrical and mechanical connection therewith. The upper end of the plunger rod 147 is flanged at 175 and is loosely held within the nut 170, this nut being drilled and counterbored to receive the tube 147 and to retain the flange 175.

Whereas the body 167 of the piston is fitted closely to the inner walls of the tube 162, it is not desirable to retard the operation of the movable plunger system during the arc lengthening and extinguishing motion which follows the blowing or melting of the fusible link 144. To this end a portion of the inner walls of the sleeve 162 are provided with grooves 176—176 forming a by-pass around the piston. Throughout another portion of the bore indicated at 177 (see Figure 13, part I) the grooves are discontinued so that the piston fits the cylinder with a relatively tight fit. Above the cylinder portion 177 the grooves 178 provide a by-passing action for the piston 166 so that the movement of the plunger is rapid in bringing the switch contacts 172—173 into engagement.

Inasmuch as it is desirable to provide for refusing of the units in the field and this involves pulling the piston down against the spring, as will be explained later, I provide a check valve to permit the piston to be drawn through the cylinder 177 without the necessity for overcoming the suction which would be created by such movement of the piston in the cylinder portion 177. To this end a valve body 179, fitting loosely within the flanged sleeve 168 of the piston 166, is provided. This valve body is tubular in form and has a flange 182 which is clamped against the lower end of the sleeve 168 by the shoulder 180 within the nut 170 and a small spacing ring 183. The valve body 179 thus makes a fluid-tight joint with the sleeve 168. At the same time, the spacing ring 183 provides for a degree of freedom of the connection between the nut 170 and the flanged upper end of the plunger tube 147. The valve body 179 has a bore therethrough, this bore 184 communicating with the bore of the tube 147. The tube 147 has openings 185 providing a free passageway from the bore 184 of the valve body 179 to the spring chamber, that is, the space below the piston 166. The valve body 179 has a counterbore terminating in a conical valve seat 186. A conical valve 187 is guided in the counterbore and is held against displacement by a guard 188 formed integral with the lower end of the switch contact 172. The valve 187 has a bore therethrough in which is seated an adjustable vent, this adjustable vent being in the form of a screw 189 having a graduated passage drilled therethrough to provide for the escape of air from the dashpot at a predetermined rate.

The valve is intended to operate as a check valve with a controlled by-pass or vent consisting of the passageway 190 through the machine screw 189.

In operation the parts are first set in the condition shown in Figure 13, that is, with the fusible link 144 in place and the terminal lead 150 making contact with the lower ferrule 155 through the brackets 154. A mounting, such as is shown in Figures 1, 2 and 3 may be provided, the spring contacts being modified accordingly, and the element 3 being a fuse of the type disclosed herein or as shown in Conrad Patent No. 1,818,382, or as shown in the copending application of Allan Ramsey Serial No. 671,660, filed May 18, 1933. The mounting as shown in Fig. 1 may be employed by turning it upside down to bring the openings of the expulsion fuse at the bottom.

The fusible link 144 may be of any preferred or suitable construction. In Figure 14 I have shown the details of construction of a link suitable for this purpose. It comprises two metal arcing terminals 192 and 193 which are substantially identical in construction. These arcing terminals have flanges 194 and are threaded as at 195 to receive connecting studs 196 from the upper coupling 145 and 197 from the lower coupling 148. Coupling 148 has a socket receiving the upper end of the flexible leads 150, this socket being swaged upon the end of the flexible leads or otherwise secured thereto. The arcing terminals 192 and 193 comprise cylindrical portions which are drilled axially to receive the strain wire 199 in the center and are drilled to receive the silver or other metallic fuse wire 200. A sleeve of glass or insulation of suitable character 202 surrounds the strain wire 199. The fuse wire 200 has its ends projected into the endwise drilling in the arcing terminals 192 and 193 and the body thereof coiled about the sleeve of insulation 202.

The ends of the strain wire and the ends of the fuse wire are pinched by collapsing the walls of the holes in which they project to provide a good mechanical and electrical bond. A suitable sleeve of insulation 203 is seated on the ends of the studs 192 and 193, the ends being suitably reduced for a short distance as indicated at 204 to align the arcing terminals and to hold the sleeve 203 concentric. Upon the outside of the arcing terminals 192, 193 and the insulating sleeve 203 a split cylinder of cork 205 is seated, this cylinder of cork being held in place between the flanges 194 of the arcing terminals and closely gripping the said arcing terminals and the sleeve 203 by means of a wrapping of paper 206 or the like. In the preferred form of the device, the cork 205 and its wrapper are omitted. The fusible link 144 may be of any suitable design.

With the parts in the position as shown in Figure 13 and the unit connected in an inverted mounting of the type shown in Figures 1, 2 and 3, the operation is as follows: Assume that the unit shown in Figure 13 is unit 1, of Figure 1, connected between the incoming and outgoing lines, the connections being arranged to provide connection from the incoming line for example to the intermediate terminal 159 and the outgoing line for example to the lower terminal 155. Upon the occurrence of overload the fusible link 144 melts, releasing the plunger rod 147. At the same time the lower terminal 148 and its connected lead 150 is expelled. The compression spring 165 expands, driving the piston and plunger rod upwardly with a rapid motion, extending the length of the arc and assisting in the extinguishing of the same. The removable liner 157 may assist in the putting out of the arc and interruption of current flow. The liner 157 may be a sleeve of solid arc extinguishing material either with or without a backing, or it may be a porous material embodying solid or liquid arc extinguishing material either in the free state or in combination. This liner is optional.

The rapid separating motion of the arcing terminals proceeds far enough that the arc will be extinguished by the time that the piston 166 reaches the dashpot cylinder portion 177, where escape of air which previously occurred around the piston through the grooves 176, 176, is prevented. The air which is trapped above the piston when it is in the cylinder portion 177 is permitted to escape slowly through the clearance of the piston with the cylinder walls and through the drilled passageway 190 in the valve 187. As soon as the piston passes beyond the end of the cylinder portion 177 the plunger again moves rapidly because of the by-passing effect of the grooves 178—178 around the piston 166 and the movable contact 172 is then plunged into engagement with the stationary switch contact 173, the insulating guide ring 106 serving the same function as heretofore described, namely, of bringing the parts into alignment without chatter or bouncing. Thus the interruption of the circuit existing originally through the fuse 144 is now shifted through the switch contacts 172—173 to a second unit of similar character.

For re-fusing in the field the sleeve 156 is unscrewed from the intermediate ferrule 159 and the sleeve 156 is moved clear of the lower end of the plunger tube 147. The arcing tip 145 is then unscrewed from the tube 147 and a new unit put in place. The flexible lead 150 beyond the plug or button 152 is long enough to extend completely through the tube 156 when it is screwed back into place. The projecting end of the flexible lead 150 is then grasped and the plunger and its connected parts pulled downwardly until the button 152 is brought into a split socket or seat 153 and the end of the lead 150 is then cut off and the device is again ready for operation. When the movable piston is thus pulled downwardly, the piston 166 is prevented from creating a reverse dashpot action by the action of the valve 187 which is automatically raised from its seat, providing a free passageway from the spring chamber into the space above the piston 166.

In the embodiment shown in Figure 15 the method of securing a dashpot action differs from that shown in Figure 13 but the general mode of operation is substantially the same. In this construction a metallic cylinder for the dashpot piston is provided. The upper sleeve of insulation 162 supports a cap 174 as shown in Figure 13, part 1, with a suitable switch contact 173 and guiding ring 106, these parts being omitted for the sake of clearness. The lower expulsion tube 156 and its lower ferrule 155 are substantially the same as in Figure 13. The plunger rod 206 is coupled to the coupling 145 of the fusible link 144, as shown in Figure 15, part 2, and at the upper end of Figure 14. The fusible link 144 is otherwise identical with the construction shown in Figure 13 and as illustrated in detail in Figure 14. The plunger rod 206 extends through the intermediate ferrule or terminal 159 and has connected along its intermediate part the flexible leads 77, the lower ends of which extend through drill holes in the boss 164 and are clamped in a counterbore in the lower side of the intermediate terminal 159, as by means of the washer 207 which is engaged by the upper end of the metallic fitting 208 secured upon the upper end of the expulsion fuse tube 156. Obviously, the washer 207 may be held in place by a separate ring threaded into the counterbore above the metal fitting 208 of the expulsion fuse tube. Above the connection of the flexible leads 77 the rod 206 extends through the movable dashpot 209 and is threaded into a switch contact member 210. The contact 210 has a skirt 212 within which is housed a compression spring 213. This spring 213 tends to expand to throw the switch contact 210 upwardly. However, the rod 206 is restrained from motion by the fusible link 144 and its connected lead 150. The spring 213 reacts against a flange 214 carried on the upper end of a tubular piston rod 215. The tubular piston rod 215 is connected at its lower end to the dashpot piston 216 which piston 216 is engaged by the upper end of the compression coil spring 165. Thus the force of the spring 165 is exerted through the piston 216, the tubular rod 215, flange 214, and skirt 212 of the tip 210 upon the rod 206, which rod is restrained from motion by the fusible link. The movable cylinder 217 of the dashpot has an annular shoulder 218 which moves in the enlarged portion of the bore of the sleeve 162 and is limited by a buffer ring 221 at the junction of the enlarged bore of the sleeve 162 and its normal or reduced bore. Below the shoulder at the buffer ring 221 the tube is of larger internal diameter than above said shoulder. The cylinder 217 has a head member 219 through which may be formed a leakage or vent port 220 to permit the escape of air from inside the cylinder when the piston 216 is moved upwardly in the cylinder and vice versa to control the entry of air when the piston is retracted from the head. A pair of spring detents 222 having their outer ends provided with hooks and provided with an intermediate diagonal portion 223 for unlocking the hooks, constitute means for holding the switch contact 210 and thereafter releasing the same. These detents 222 are relatively long spring fingers mounted upon the cylinder head 219. The lower end of the skirt 212 of the switch contact 210 has a flange which is adapted to be caught by the hooked ends of the detents 222. The diagonal or release portions 223 are adapted to be engaged by the flange member 214 when the same is moved upwardly and the flange spreads the detent so as to release the switch contact to permit the spring 213 to throw the switch contact 210 suddenly into engagement with the stationary switch contact such as 173 shown in Figure 13.

The operation of the device in an installation of the type shown in Fig. 1, suitably designed to permit successive fuses to be introduced into the circuit, is as follows: Normal flow of current from the incoming line proceeds to the intermediate ferrule 159, from thence through the flexible leads 77 to the plunger rod 206. From here the current flow is through the fusible link 144, its lead 150, brackets 154 and lower ferrule 155 which is connected to the outgoing line, or load. Upon the occurrence of excessive current flow, such as will cause melting of the fusible link, the strain wire 199 yields and the arcing tips 192 and 193 are separated with a resultant explosion, or expansion of gases and vapors, expelling the lower terminal and its lead 150 and permitting immediately both the spring 213 immediately beneath the switch contact 210, and the main spring 165 under the piston of the dashpot, to expand. The upper spring 213 is free to expand without any retardation except the inertia of the parts, whereas upward motion of the parts engaged by the spring 165 is more or less retarded by the fit which the flange 218 of the dashpot cylinder 217 has with the enlarged bore as well as the backward thrust of the spring 213. The piston 216 is free to move in the cylinder 217 except that the trapped gas tends to force the cylinder 217 upwardly. The expansion of the spring 213 throws the switch contact 210 upwardly until the flange 224 is caught by the detents 222 and therefore further motion of the switch contact 210 relative to the cylinder 217 is prevented. The main spring 165, however, rapidly throws the cylinder 217 upwardly until the flange 218 engages the buffer ring 221, stopping further advance of the dashpot cylinder 217. The spring detents 222 and the contact 210 and rod 206 are moved up with cylinder 217 until it is stopped. The motion of the piston 216 is then delayed by the entrapping of air between it and the head 219, the air gradually escaping through the clearance and through the vent 220 until the flange 214 arrives in contact with the diagonal portions 223 of the spring detents 222. This flange member 214 forces the detents apart and releases the switch terminal 210. By the advance of the flange member 214 toward the diagonal parts of the spring detents the spring 213 is compressed and as soon as the detents 222 release the flange 224 of the switch contact the spring 213 rapidly expands, throwing the switch contact 210 into engagement with the stationary contact 173, thereby closing the circuit to the next unit.

In re-fusing in the field the operation is as previously described in connection with Figure 13. The expulsion tube 156 is unscrewed, exposing the lower end of the rod 206. A fusible link, with attached flexible terminal 150 of a length suitable to extend out of the lower end of the tube 156 before the springs 213 and 165 are compressed, is provided. When the tube 156 is replaced and the terminal 150 pulled downwardly, the springs are compressed and the parts move into the position shown in Figure 15. In order to insure the separation of the piston 216 from the cylinder head 219 a suitable stop may be provided within the bore of the tube 162 for engagement by the flange 218.

It will be seen in this embodiment that the movable plunger, including the arcing tips of the fusible link and the switch contact 210, is first given a rapid movement for the extinguishment of the arc. The motion of the parts is then arrested while the dashpot is collapsed and then the switch contact is released for a rapid final movement in closing the contacts to shift the circuit to the next unit.

In mounting the units heretofore described, or similar units, in an assembly such as is shown in Figures 1, 2 and 3, I employ, for the upper and lower mounting clips, or spring contacts, spring clips of the character shown in the patent to Conrad No. 1,665,446. These clips employ a wire bail folding longitudinally of the fuse over the ends of the fuse to spring together the spring jaws and also to prevent accidental displacement out of the spring jaws. Inasmuch as a bail cannot be employed on the intermediate contact, I provide a contact such as shown in detail in Figures 16, 17 and 18. In this construction the main jaws are formed of a U-shaped spring member 265 having the sides doubled upon themselves to provide the contacting portions 266—266. Where the side of the ferrule or contact on the fuse is slabbed off to provide flat sides, these contact portions 266—266 are straight. If the ferrule is cylindrical, then the contact portions 266 may be curved to conform to the outer cylindrical surface of the ferrule.

The lower ends of the arms 266 abut against reinforcing arms 267 formed of a U-shaped spring member. The bottoms of the members 265 and 267 are clamped together upon a supporting bar such as 19 as by means of bolts such as 268 and the base 269 of a bracket 270. The bracket 270 is cut out as indicated by the line 272 to clear the ferrule. Where the bracket is used for the terminal ferrules the bracket 270 may extend across the end of the ferrule to prevent longitudinal displacement. The cut-out portion 272 may also form a shoulder engaging the end of the ferrule to prevent longitudinal displacement.

Projections 273 are pressed inwardly above the contact portions of the contact arms 266 to provide resistance against accidental displacement of the fuse out of the clips when the bail or clamp is released. Similar projections 274—274 are pressed out of the outer arms of the contact member 265 and one of these serves as a detent for engagement by the hook-shaped end 275 of the clamp or latch member 276. This clamp or latch member is channel-shaped in cross-section with the ring or eye 277 mounted upon the back of the channel, and the sides of the channel bent down as shown at 278—278 in Figure 16 over the extreme ends of the U-shaped contact member 265. A transverse web 279 of cylindrical contour to fit the cylindrical curved end or bight 280 of the reflexed arms 266, prevents the end of the latch or clamp 276 from dropping downwardly. A cylindrical collar 282 is disposed within the curved bight or bend and a transverse pin extends through the sides of the latch or clamp and through the collar, thus providing the pintle of a hinge.

The operation of the device is as follows: When it is desired to insert a fuse the operator unlatches the clamp or latch 276 by inserting a hook in the eye 277 and pulling outwardly. The detent formed by the projection 274 resists such outward motion but the nose 275 of the latch rides over the detent and the clamp or latch may then be swung clear of the contacts for the insertion or removal of a ferrule.

Obviously, instead of using wire bails on the end clips, contacts such as shown in Figures 16 to 18 may be employed for both the end and the intermediate contacts, or for any other similar purpose.

I do not intend to limit the intermediate contact to the above form, as any suitable arrangement for mounting the units in the assembly may be provided.

It is broadly new, so far as I am aware, to provide a unit which involves a safety circuit interrupter and a transfer switch, all within the same housing. While I have shown the fuse as the safety element it is to be understood that a switch electromagnetically released, as disclosed in the patent to Conrad No. 1,336,069, may be combined with the transfer switch to provide the necessary safety overload interrupter and the transfer switch for transferring the current flow to a succeeding unit. Also, instead of carrying all of the current through the fuse, some of it may be carried through switch contacts, as disclosed in the patent to Conrad, No. 1,294,621.

An important aspect of the invention is the utilization of a relatively long, small diameter housing, with external contacts, so that the unit may be mounted removably in fuse clips or like contacts, which provide not only the electrical connection but also the mechanical support. The complete enclosure of all the operating parts is desirable, particularly the circuit interrupting and circuit closing portions.

An important concept resides in the common movable element which partakes of the fuse interrupting or opening motion and of the switch closing motion.

Figure 7:
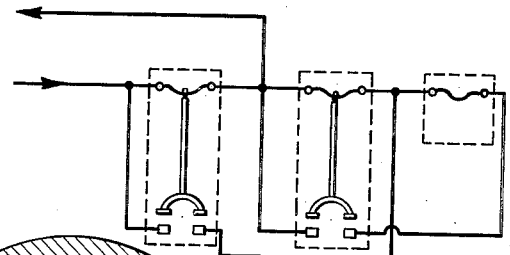
Figure 7 is a diagram of a modified arrangement embodying my invention.
Figure 7A:
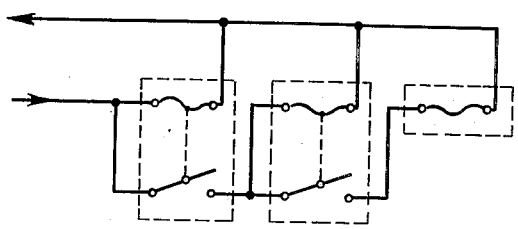
Figure 7A is a similar diagram of a further modification.

In Figures 7 and 7A I have indicated diagrammatically variations which my invention may take within the broad aspects of the same, namely, in Figure 7 I have shown a fuse which mechanically supports a movable member which, at its lower end, provides a bridging contact for closing the transfer switch to include a second unit. The fuse may be directly in tension.

The combined fuse and switch of Figure 7 is preferably enclosed in a common housing with external contacts, as indicated by dotted lines in the diagram of Figure 7. This specific arrangement does not lend itself so readily to the elongated, small diameter housing.

Likewise, in Figure 7A, I have shown a similar arrangement in which a tension member is supported by the fuse. The fuse may be directly in tension and connected to the switch blade. The fuse, in turn, holds open a swinging switch arm. The switch and fuse unit is contained within a single enclosure, which may be partitioned into chambers, but the melting of the fuse permits the motion of the switch closing member to occur.

The piston of the dashpot may be stationary and the cylinder carried by the plunger.

In the air expulsion units the walls of the spring chamber may be slotted away to permit visual inspection of the device to determine whether the unit has been operated. Such slots may be covered by transparent closures or a single glass sleeve.

I do not intend to be limited to the details shown and described, but intend to include all variations which will occur to those skilled in the art, and which come within the spirit of my invention.

I claim:—

1. In a device of the class described, a terminal for an incoming line conductor, a terminal for an outgoing line conductor, a fuse device connected at one end to one of said terminals; an interrupting and reclosing device comprising three stationary contact terminals, the first contact terminal being connected to one of said line terminals, the second contact terminal being connected to said other line terminal, and the third contact terminal being connected to the other end of said fuse device and insulated from said second contact terminal; said interrupting and reclosing device including a circuit interrupter between said first and second contact terminals, said circuit closer and circuit interrupter comprising a common movable element for successively operating the circuit interrupter to open the connection between said line terminals and then the circuit closer to connect said fuse device between said line terminals.

2. In a device of the class described, the combination of a first terminal, a second terminal spaced from the first terminal, and a third intermediate terminal, said terminals being supported in insulated relation and in alignment, a movable rodlike member normally connecting the first and third terminals, means for holding said member in circuit closing position during normal current flow, and means acting upon excessive current flow to shift said movable member endwise away from the first terminal to interrupt current flow between the first and third terminal and toward the second terminal to establish a path for current flow between the third and the second terminal.

3. In a device of the class described, a housing having end terminals and an intermediate terminal, a plunger in the housing having a movable fuse terminal, a movable switch terminal adapted to be moved by said plunger, a fuse between one end terminal and said fuse terminal and holding the plunger against motion, a stationary switch contact connected to the other end terminal and being adapted to be engaged by the movable switch terminal, said movable fuse terminal and movable switch terminal being connected to said intermediate terminal, and a body of arc extinguishing material adjacent the fuse for providing an arc extinguishing blast, and a spring tending to move said plunger.

4. In a device of the class described, a plurality of fuse devices having upper and lower fuse terminals, the upper terminals of said devices being connected together, a circuit terminal, one of said fuse devices having its lower fuse terminal connected to said circuit terminal and having a circuit reclosing terminal connected to the lower fuse terminal of a second one of said devices, and said one device having a movable member connected to its lower fuse terminal and adapted to be released upon the occurrence of overload to break the connection between its upper and lower fuse terminals and to make connection between its lower fuse terminal and said circuit reclosing terminal.

5. In combination, a pair of line conductor terminals, a plurality of fuses adapted to be connected one at a time between said line conductor terminals, a plurality of reclosing switches for successively switching said fuses into connection with said line conductor terminals, each switch comprising a member movable with a translatory motion and retained in position by a fuse, and released by the melting of the corresponding fuse to permit the movable member to close the switch to connect the next fuse between the line conductor terminals, said fuses having stationary housings completely enclosing said fuses and switches.

6. In combination, a pair of line conductor terminals, a plurality of fuses adapted to be connected one at a time between said line conductor terminals, a plurality of reclosing switches for successively switching said fuses into connection with said line conductor terminals, each switch comprising a movable member retained in position by a fuse, and released by the melting of the corresponding fuse to permit the movable member to close the switch to connect the next fuse between the line conductor terminals, each fuse and its corresponding reclosing switch being disposed within a unitary housing.

7. In combination, a pair of line conductor terminals, a plurality of fuses adapted to be connected one at a time between said line conductor terminals, a plurality of reclosing switches for successively switching said fuses into connection with said line conductor terminals, each switch comprising a movable member retained in position by a fuse, and released by the melting of the corresponding fuse to permit the movable member to close the switch to connect the next fuse between said line conductor terminals, and a tubular housing for enclosing each switch and its corresponding reclosing switch, said tubular housing having external terminals for the fuse and the switch.

8. In combination, a pair of line conductor terminals, a plurality of units comprising a plurality of fuses adapted to be connected one at a time between said line conductors, a plurality of reclosing switches for successively switching said fuses into connection with said line conductor terminals, each switch comprising a movable member retained in position by a fuse, and released by the melting of the corresponding fuse to permit the movable member to close the switch to connect the next fuse between the line conductor terminals, and said units each comprising three metallic ferrules in insulated spaced relation, one for the fuse, one for the switch and one common to both the fuse and the switch.

9. In combination, a pair of line conductor terminals, a plurality of fuses adapted to be connected one at a time between said line conductor terminals, a plurality of switches for reclosing said fuses into connection with said line conductor terminals, each switch comprising a movable member retained in position by a fuse, and released by the melting of the corresponding fuse to permit the movable member to close the switch to connect the next fuse between said terminals, and a timing device controlling the rate of movement of said member.

10. In a device of the class described, a housing having external terminals, a fuse and a switch in said housing connected to said terminals, an arc extinguishing liquid in said housing disposed to assist in extinguishing the arc formed on blowing of said fuse and to cover the contact members of said switch, and an operating member for the switch held against actuation by the fuse.

11. In combination, a housing having an incoming line terminal, a load terminal and a reclosing terminal, a fuse in said housing connected between the incoming line terminal and the load terminal, a switch in said housing connected between the load terminal and the reclosing terminal, and an arc extinguishing liquid in said housing disposed to assist in extinguishing the arc formed on blowing of said fuse and to cover the contact members of said switch, said switch being closable only upon melting of the fuse, said housing protecting the fuse and switch from adverse external influences.

12. In combination, a power fuse, a power switch held open by the fuse, a housing for the fuse and switch to exclude adverse outside influences and an arc extinguishing liquid in said housing disposed to assist in extinguishing the arc formed on blowing of said fuse and to cover the contact members of said switch.

13. In combination, a power fuse, a power switch held open by the fuse, a housing for the fuse and switch to exclude adverse outside influences, an arc extinguishing liquid in said housing disposed to assist in extinguishing the arc formed on blowing of said fuse and to cover the contact members of said switch, an external connection for one end of the fuse, a common external connection for the other end of the fuse and one element of the switch, and an external connection for the other element of the switch.

14. In a device of the class described, a plurality of stationary fuse housings having fuses, circuit terminals between which the fuses are to be connected one at a time, and a switch in each of said housings having a switch member movable with a translatory motion and controlled by the fuse therein for switching the fuses successively between said terminals.

15. In a fuse and switch unit, a housing comprising a pair of aligned sleeves of insulation, an intermediate ferrule joining said sleeves, end ferrules on the outer ends of the sleeves, a fuse terminal connected to one end ferrule, a switch contact connected to the other end terminal, and a plunger electrically connected to said intermediate ferrule and having a fuse terminal at one end and a switch contact at the other end, and a fuse connected between the fuse terminals and holding the plunger in position to maintain the switch contacts separated.

16. In a fuse and switch unit, a housing comprising a pair of aligned sleeves of insulation, an intermediate ferrule joining said sleeves, end ferrules on the outer ends of the sleeves, a fuse terminal connected to one end ferrule, a switch contact connected to the other end terminal, and a plunger electrically connected to said intermediate ferrule and having a fuse terminal at one end and a switch contact at the other end, a fuse connected between the fuse terminals and holding the plunger in position to maintain the switch contacts separated, a dashpot comprising a stationary cylinder and a cooperating piston controlling the motion of the plunger.

17. In a combined fuse and switch unit, a housing, a fuse in one end of the housing, a switch disposed at the other end of the housing, the closing of the switch being prevented by the fuse, and means for delaying the closing of the switch when the fuse is melted.

18. In a combined fuse and switch unit, a housing, a fuse in one end of the housing, a switch disposed at the other end of the housing, the closing of the switch being prevented by the fuse, a dashpot for delaying the closing of the switch when the fuse melts, said housing being substantially filled with liquid, said dashpot occupying substantially the full bore of the housing, said dashpot having a passageway therethrough to permit the passage of gas bubbles, and a valve for closing the passageway when the dashpot is actuated.

19. In a device of the class described, a tubular housing carrying external terminals and having a bore, a fuse in one end of the bore of the housing, a switch in the other end of the bore of the housing, a movable member for closing the switch, said member being restrained by the fuse, a part of said bore providing a dashpot cylinder and a dashpot piston carried by the member and being adapted to cooperate with the cylinder throughout a part of the travel of said member.

20. In a device of the class described, a tubular housing having a longitudinal bore, means at the ends of the housing forming external terminals and an intermediate external terminal, a plunger in said bore, said plunger having a fuse terminal electrically connected to said intermediate terminal, a fuse in the end of the housing connected between said fuse terminal and the adjacent end terminal, a coil spring surrounding the plunger and being normally under stress to tension the fuse, a switch in the bore remote from the fuse, said switch having a stationary contact connected to the adjacent end terminal, and a contact movable by the plunger, said movable contact being electrically connected to the intermediate terminal.

21. In a device of the class described, a tubular housing having a longitudinal bore, means at the ends of the housing forming external terminals and an intermediate external terminal, a plunger in said bore, said plunger having a fuse terminal electrically connected to said intermediate terminal, a fuse in the end of the housing connected between said fuse terminal and the adjacent end terminal, a coil spring surrounding the plunger and being normally under stress to tension the fuse, a switch in the bore remote from the fuse, said switch having a stationary contact connected to the adjacent end terminal, a contact movable by the plunger, said movable contact being electrically connected to the intermediate terminal, and a timing device for retarding the motion of the plunger during a part of its travel.

22. In a device of the class described, a tubular housing having a longitudinal bore, means at the ends of the housing forming external terminals and an intermediate external terminal, a plunger in said bore, said plunger having a fuse terminal electrically connected to said intermediate terminal, a fuse in the end of the housing connected between said fuse terminal and the adjacent end terminal, a coil spring surrounding the plunger and being normally under stress to tension the fuse, a switch in the bore remote from the fuse, said switch having a stationary contact connected to the adjacent end terminal, a contact movable by the plunger, said movable contact being electrically connected to the intermediate terminal, and a dashpot having a cylinder and a piston which is actuated by said plunger.

23. In a device of the class described, a tubular housing having a longitudinal bore, means at the ends of the housing forming external terminals and an intermediate external terminal, a plunger in said bore, said plunger having a fuse terminal electrically connected to said intermediate terminal, a fuse in the end of the housing connected between said fuse terminal and the adjacent end terminal, a coil spring surrounding the plunger and being normally under stress to tension the fuse, a switch in the bore remote from the fuse, said switch having a stationary contact connected to the adjacent end terminal, a contact movable by the plunger, said movable contact being electrically connected to the intermediate terminal, a dashpot having a cylinder and a piston which is actuated by said plunger, and a bypass valve for the dashpot closed by motion of the plunger.

24. In a device of the class described, a tubular housing having a relatively stationary switch contact at one end, a movable switch contact, a plunger in said housing for operating said movable switch contact to cooperate with said first named switch contact, means for moving said plunger to close the switch, and a dashpot disposed within the bore of the tubular housing for retarding the motion of the plunger until a period of time has expired, whereupon the plunger is relieved of the retarding effect of the dashpot and said switch is closed.

25. In a device of the class described, a tubular housing having a relatively stationary switch contact at one end, a movable switch contact, a plunger in said housing for operating said movable switch contact to cooperate with said first named switch contact, means for moving said plunger to close the switch, and a dashpot disposed within the bore of the tubular housing for retarding the motion of the plunger until a period of time has expired whereupon the plunger is relieved of the retarding effect of the dashpot and said switch is closed, said dashpot comprising a movable member cooperating with the walls of the bore.

26. In a device of the class described, a tubular housing comprising a pair of sleeves held in coaxial alignment, an intermediate ferrule for holding said sleeves in alignment, one sleeve comprising an expulsion tube, a plunger extending through the ferrule and being disposed partly within the expulsion tube, a spring in the other sleeve for moving the plunger in a direction away from the expulsion tube, a fuse in the expulsion tube preventing movement of the plunger, a switch in said other sleeve controlled by said plunger.

27. In a device of the class described, a tubular housing comprising a pair of sleeves held in coaxial alignment, an intermediate ferrule for holding said sleeves in alignment, one sleeve comprising a fuse tube, a plunger extending through the ferrule and being disposed partly within the fuse tube, a spring in the other sleeve for moving the plunger in a direction away from the fuse tube, a fuse in the fuse tube preventing movement of the plunger, a switch in said other sleeve controlled by said plunger, said fuse tube being releasable from the ferrule to permit renewal of the fuse, said fuse having a flexible lead to permit the plunger to be moved to open the switch when the fuse is renewed.

28. In a device of the class described, a tubular housing comprising a pair of sleeves held in coaxial alignment, an intermediate ferrule for holding said sleeves in alignment, one sleeve comprising a fuse tube, a plunger extending through the ferrule and being disposed partly within the fuse tube, a spring in the other sleeve for moving the plunger in a direction away from the fuse tube, a fuse in the fuse tube preventing movement of the plunger, a switch in said other sleeve controlled by said plunger, said fuse tube containing a liner comprising arc extinguishing material for evolving a gaseous arc extinguishing medium upon the formation of an arc.

29. In a device of the class described, a pair of axially aligned sleeves, an intermediate ferrule holding the sleeves together in alignment, said ferrule constituting internally a dashpot cylinder, a dashpot piston in said cylinder, said piston having a by-pass for gas, a valve for closing said by-pass, means normally holding said valve in open position, a spring anchor secured internally to said ferrule, a plunger extending through the spring anchor and piston, a spring connecting said plunger and spring anchor, a fuse holding the plunger against movement by the spring, and a switch adapted to be actuated by the plunger, said dashpot piston retarding the intermediate part of the motion of the plunger.

30. In a device of the class described, a pair of axially aligned sleeves, an intermediate ferrule holding the sleeves together in alignment, said ferrule constituting internally a dashpot cylinder, a dashpot piston in said cylinder, said piston having a by-pass for gas, a valve for closing said by-pass, means normally holding said valve in open position, a spring anchor secured internally to said ferrule, a plunger extending through the spring anchor and piston, a spring connecting said plunger and spring anchor, a fuse holding the plunger against movement by the spring, and a switch adapted to be actuated by the plunger, said dashpot piston retarding the intermediate part of the motion of the plunger, said plunger having an enlargement adapted to close said valve and serving as a guide within the spring anchor.

31. In combination, a housing having a movable plunger, a stationary switch contact carried in the housing, a cooperating movable switch contact operated by the plunger, a dashpot in the housing for retarding a part of the motion of the plunger, and a body of liquid covering said switch contacts when they are about to close and serving as a working medium for the dashpot.

32. In combination, a housing having a movable plunger, a stationary switch contact carried in the housing, a cooperating movable switch contact operated by the plunger, a dashpot in the housing for retarding a part of the motion of the plunger, and a body of liquid covering said switch contacts when they are about to close and serving as a working medium for the dashpot, a fuse having separable terminals actuated by said plunger, said liquid serving as an arc extinguishing medium for the arc resulting from the melting of the fuse.

33. In combination, a closed tubular housing having end terminals and an intermediate terminal, a movable system comprising a plunger disposed within the housing, a fuse within one end of the housing connecting one end of the plunger with the adjacent end terminal, spring means for tensioning the fuse, said spring means being connected to the plunger and adapted to move the same to extend the arc caused by melting of the fuse, the plunger carrying at its end opposite the fuse a cylindrical contact member, a cooperating contact socket within the housing and connected to the other end terminal, said socket comprising a circular guide of insulation, a plurality of contact fingers adapted to embrace the cylindrical contact member of the plunger, and a garter spring surrounding the contact fingers and holding the same under stress against the guiding ring.

34. In a circuit controlling device, the combination of a first fuse, a second fuse, switching means controlled by melting of the first fuse to transfer the circuit from the first fuse to the second fuse, and timing means for controlling the operation of said switching means comprising a pair of hermetically sealed liquid containing chambers having a flow restricting passage connecting them, and movable means for forcing the liquid from one chamber into the other controlling said switching means.

35. A fuse device for use in connection with a repeating fuse mechanism or the like comprising, in combination, a fuse housing having end terminal members and an intermediate terminal member thereon, a switch member electrically connected to said intermediate terminal member in said housing and movable axially relative thereto, said switch member being biased toward contact engagement with one of said end terminal members, and a fusible element interconnecting said switch member and the other end terminal member and restraining said switch member from movement toward said one end terminal member.

36. In combination, a tubular housing having an incoming line terminal member, a load terminal member and a reclosing terminal member, a switch member electrically connected to said load terminal member and biased for movement axially of said tubular housing into contact engagement with said reclosing terminal member, and fusible means electrically interconnecting said line terminal member and said switch member and mechanically restraining the latter, said fusible means on blowing opening the circuit between said line and load terminal members and releasing said switch member to close a circuit between said load and reclosing terminal members.

37. The combination with a pair of renewable fuse devices and a transfer switch for shifting a circuit from one fuse device to the other when the one fuse device blows, of a timing device for delaying the transfer of said circuit to said other fuse device, comprising a chamber having a fixed wall at one end and a relatively movable wall at the other end, one of said walls having a restricted aperture associated therewith to permit fluid to flow therethrough, the delay action of said timing device being provided by movement of said movable wall toward said fixed wall as controlled by the flow of fluid out of said chamber through said restricted aperture, and check valve means operating to permit free movement of said movable wall away from said fixed wall.

38. A hydraulic escapement device for determining the time between the blowing of one fuse of a reclosing fuse device and the closing of a transfer switch to reestablish the circuit through the next fuse, comprising, in combination, a cylinder closed at one end, a piston slidably mounted in said cylinder, a check valve in said piston disposed to be closed when it is moved toward said closed end and to be opened when moved in the opposite direction, an opening extending transversely through said piston, and a needle valve disposed to cooperate with said opening.

39. In reclosing fuse apparatus, in combination, a timing device for determining the interval between the blowing of one fuse device and the closing of a transfer switch to reestablish the circuit through the next fuse device, and a lost motion member cooperating with said timing device to retard the closing of said switch after one fuse device blows, said lost motion member being arranged and adapted to prevent the timing device from offering resistance to the restoration of the blown fuse device to its normal operating position.

40. The combination, with a pair of fuse devices and a transfer switch for shifting a circuit from one fuse device to the other when the one fuse device blows, of a fuse member operating on blowing of a fusible element of said one fuse device for initiating the operation of said transfer switch, a spring for biasing the contact members of said switch into contact engagement, and means arranged and adapted to prevent said contact members from rebounding on engagement thereof.

41. In combination, a pair of fuse devices and a transfer switch arranged and adapted to shift a circuit from one fuse device to the other fuse device on blowing of the fusible element of said one fuse device, said transfer switch including a movable switch member actuated on blowing of said fusible element, a stationary switch member disposed to be engaged by said movable switch member, a plurality of contact fingers on one of said switch members for effecting contact engagement with said other switch member, and resilient means biasing said fingers into said contact engagement.

42. In combination, a pair of fuse devices and a transfer switch arranged and adapted to shift a circuit from one fuse device to the other fuse device on blowing of the fusible element of said one fuse device, said transfer switch including a movable switch member actuated on blowing of said fusible element, a stationary switch member disposed to be engaged by said movable switch member, a plurailty of contact fingers on one of said switch members for effecting contact engagement with said other switch member, resilient means biasing said fingers into said contact engagement, and stop means limiting the relative movement of said fingers under the influence of said resilient means before said contact engagement takes place.

43. A circuit interrupter comprising, in combination, a tubular housing having the inner surface thereof impregnated with an arc extinguishing medium, and a self-contained fuse device positioned inside of said tubular housing, said fuse device including a fusible element and a housing of insulation therefor.

44. A circuit interrupter comprising, in combination, a tubular housing having the inner surface thereof impregnated with an arc extinguishing medium, a self-contained fuse device mounted inside of said tubular housing and adapted to move longitudinally therein; said fuse device comprising a pair of terminal members, fusible means interconnecting said terminal members, and a housing of insulation surrounding said terminal members and said fusible means; means for anchoring one of said terminal members to one end of said tubular housing, and resilient means connected to the other of said terminal members and acting to bias them apart.

45. Circuit control apparatus comprising, in combination, a fuse mechanism normally disposed in one position to complete a circuit and to be moved to another position on blowing of a fusible element therein, normally open switch means located at one end of said fuse mechanism and disposed to complete a circuit between the terminals of said fuse mechanism, switch actuating means responsive to the movement of said fuse mechanism for initiating the operation of said switch means, and time delay means cooperative with said switch actuating means for preventing the immediate closure of said switch means, said switch actuating means being released from said time delay means in advance of the closure of said switch means to acquire sufficient momentum to close said switch means.

46. In reclosing fuse apparatus, in combination, a fuse member spring biased to open position, a transfer switch member spring biased to closed position for shifting a circuit from one fuse device to another fuse device, the two spring biased members adapted to move in cooperation with each other on blowing of a fusible element in said one fuse device, and a timing mechanism adapted to cooperate with one of said members for delaying closure of the transfer switch.

47. In reclosing fuse apparatus, in combination, a fuse member spring biased to open position, a transfer switch member spring biased to closed position for shifting a circuit from one fuse device to another fuse device, the two spring biased members adapted to move in cooperation with each other on blowing of a fusible element in said one fuse device, and a timing mechanism adapted to cooperate with said switch member for delaying closure of the transfer switch.

48. In reclosing fuse apparatus, in combination, a first fuse device, a second fuse device, a pair of separable terminal members interconnected by a fusible element in said first fuse device, spring means biasing said terminal members apart to provide quick separation thereof on blowing of said fusible element, switch means cooperating with said first fuse device for transferring a circuit from it to said second fuse device, additional spring means disposed to be released on blowing of said fusible element for biasing said switch means to the closed position, and time delay means cooperating with said additional spring means for delaying the action thereof and then releasing the same to provide quick closing of said switch means.

49. In reclosing fuse apparatus, a housing of insulation, a spring in said housing, an operating member in said housing biased by said spring, said operating member moving on blowing of a fusible element of one fuse device in a circuit to move a fuse terminal member axially of said housing to lengthen the arc formed thereby, a switch in said housing for transferring said circuit to another fuse device, means operatively connecting said operating member and said switch to close the same after the said arc is lengthened, and a timing device positioned in said housing and disposed to operate against the biasing force of said spring to delay the closing of said switch.

50. In reclosing fuse apparatus, a spring, an operating member biased by said spring, said operating member moving on blowing of a fusible element of one fuse device in a circuit to move a fuse terminal member axially thereof to lengthen the arc formed thereby, a switch for transferring said circuit to another fuse device, means operatively connecting said operating member and said switch to close the same after said arc is lengthened, and a timing device disposed to operate against the biasing force of said spring to delay the closing of said switch, said timing device comprising a chamber having one end wall movable relative to another end wall and a restricted opening associated with said one end wall, the delay action of said timing device being provided by relative movement of said end walls as controlled by flow of fluid through said restricted opening.

51. In reclosing fuse apparatus, a spring, an operating member biased by said spring, said operating member moving on blowing of a fusible element of one fuse device in a circuit to move a fuse terminal member axially thereof to lengthen the arc formed thereby, a switch for transferring said circuit to another fuse device, means operatively connecting said operating member and said switch to close the same after said arc is lengthened, a timing device disposed to operate against the biasing force of said spring to delay the closing of said switch, and means for adjusting said timing device to provide different time intervals after which said switch is closed.

52. In reclosing fuse apparatus, a spring, an operating member biased by said spring, said operating member moving on blowing of a fusible element of one fuse device in a circuit to move a fuse terminal member axially thereof to lengthen the arc formed thereby, a switch for transferring said circuit to another fuse device, means operatively connecting said operating member and said switch to close the same after said arc is lengthened, and means for causing said operating member to move rapidly at first to effect arc extinction, then slowly after the arc is extinguished, for a predetermined interval, and then rapidly again to close said switch.

53. In reclosing fuse apparatus, a spring, an operating member biased by said spring, said operating member moving on blowing of a fusible element of one fuse device in a circuit to move a fuse terminal member axially thereof to lengthen the arc formed thereby, a switch for transferring said circuit to another fuse device, means operatively connecting said operating member and said switch to close the same after said arc is lengthened, a timing device disposed to operate against the biasing force of said spring to delay the closing of said switch, and cam means on said operating member arranged and adapted to render said timing device operative when said switch is operated to the closed position and to render said timing device ineffective while said operating member is being restored to its original position.

54. The combination, with a pair of fuse devices and a transfer switch for shifting a circuit from one fuse device to the other when the one fuse device blows, of a fuse member operating on blowing of a fusible element of said one fuse device for initiating the operation of said transfer switch, and a timing device for delaying the operation of said transfer switch, said timing device being reset by replacement of said fuse member to operative position.

55. In a circuit controlling device, the combination of a first fuse, a second fuse, a spring, a movable switch member biased by said spring and released by blowing of said first fuse to transfer the circuit to said second fuse, and timing means operated by and opposing the action of said spring during a portion of its stroke whereby said switch member is released after a predetermined interval to rapidly and positively close the circuit through said second fuse.

56. In a circuit controlling device, the combination of a first fuse, a second fuse, a spring, a movable switch member biased by said spring and released by blowing of said first fuse to transfer the circuit to said second fuse, and timing means operated by and opposing the action of said spring during a portion of its stroke whereby said switch member is released after a predetermined interval to rapidly and positively close the circuit through said second fuse, said timing means comprising a chamber having an end wall and a relatively movable wall, the relatively movable wall being actuated by said switch member, and a restricting passage associated with said chamber through which a fluid is forced to flow by relative movement between said walls.

57. In reclosing fuse apparatus, a spring, a movable switch member biased by said spring for shifting a circuit from one fuse device to another fuse device when the fusible element of said one fuse device blows, means controlled by said fusible element for restraining said switch member against the force of said spring, and time delay means operated by and opposing the action of said spring during a portion of its stroke whereby a predetermined interval elapses before said circuit is transferred to said other fuse device after said fusible element of said one fuse device blows.

58. In reclosing fuse apparatus, a spring, a movable switch member biased by said spring for shifting a circuit from one fuse device to another fuse device when the fusible element of said one fuse device blows, means controlled by said fusible element for restraining said switch member against the force of said spring, and time delay means operated by and opposing the action of said spring during a portion of its stroke whereby a predetermined interval elapses before said circuit is transferred to said other fuse device after said fusible element of said one fuse device blows, said time delay means comprising a chamber having a fixed wall at one end, a relatively movable wall at the other end actuated by said switch member, a restricted aperture cooperative with said chamber, and a liquid in said chamber, the movement of said switch member being delayed by movement of said movable wall relative to said fixed wall as controlled by the flow of said liquid through said aperture.

59. In a reclosing fuse device, in combination, a time delay device for determining the time interval between the blowing of one fuse and the closing of a transfer switch to reestablish the circuit through the next fuse, comprising two hermetically sealed chambers connected by a restricting passage through which a fluid is forced to flow.

60. The combination with a pair of fuse devices and a transfer switch for shifting a circuit from one fuse device to the other when the one fuse device blows, of a timing device for delaying the transfer of said circuit to said other fuse device, comprising a chamber having a fixed wall at one end and a relatively movable wall at the other end and having a restricted passage cooperative therewith, a liquid in said chamber, and means operatively connecting said movable wall and said transfer switch, the operation of said transfer switch being delayed by movement of said movable wall relative to said fixed wall as controlled by the flow of said liquid through said passage.

61. The combination with a pair of fuse devices and a transfer switch for shifting a circuit from one fuse device to the other when the one fuse device blows, of a timing device for delaying the transfer of such circuit to said other fuse device, comprising a hermetically sealed chamber having a fixed wall at one end and a relatively movable wall at the other end and having a restricted aperture associated therewith, a liquid in said hermetically sealed chamber, and means operatively interconnecting said switch means and said movable wall, the delayed action of said timing device being provided by movement of said movable wall relative to said fixed wall as controlled by the flow of liquid through said restricted aperture.

62. In a reclosing fuse device, in combination, a time delay device for determining the time interval between the blowing of one fuse and the closing of a transfer switch to reestablish the circuit through the next fuse, comprising a chamber having an end wall and a relatively movable wall, and a restricting passage associated with said chamber through which a liquid is forced to flow by relative movement between said walls.

63. The combination, with a pair of fuse devices and a transfer switch for shifting a circuit from one fuse device to the other when the one fuse device blows, of a fuse member operating on blowing of a fusible element of said one fuse device for initiating the operation of said transfer switch, and means arranged and adapted to prevent the contact members of said transfer switch from rebounding on engagement thereof.

64. In a repeating fuse mechanism, in combination, a pair of fuse devices one of which is normally adapted to be connected in a circuit, a transfer switch arranged and adapted to connect the other fuse device in said circuit on blowing of a fusible element in said one fuse device, said transfer switch comprising a stationary contact member and a movable contact member, said stationary contact member being engaged by movement of said movable contact member from underneath, and a housing in proximity to said stationary contact member comprising a weather protection therefor.

HUGH A. TRIPLETT.